US012718752B2

(12) United States Patent
Kim et al.

(10) Patent No.: US 12,718,752 B2
(45) Date of Patent: Aug. 25, 2026

(54) ELECTRONIC DEVICE AND METHOD FOR PREDICTING AND COMPENSATING FOR RESIDUAL IMAGE ON DISPLAY

(71) Applicant: Samsung Electronics Co., Ltd., Suwon-si (KR)

(72) Inventors: Hanyuool Kim, Suwon-si (KR); Seungkyu Choi, Suwon-si (KR); Taehyeong Kim, Suwon-si (KR); Taewoong Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 56 days.

(21) Appl. No.: 18/532,150

(22) Filed: Dec. 7, 2023

(65) Prior Publication Data

US 2024/0112627 A1 Apr. 4, 2024

Related U.S. Application Data

(63) Continuation of application No. PCT/KR2022/007766, filed on May 31, 2022.

(30) Foreign Application Priority Data

Jun. 15, 2021 (KR) ........................ 10-2021-0077488

(51) Int. Cl.
*G09G 3/3208* (2016.01)
*G06T 7/11* (2017.01)
*G06T 11/00* (2026.01)

(52) U.S. Cl.
CPC .............. *G09G 3/3208* (2013.01); *G06T 7/11* (2017.01); *G06T 11/00* (2013.01); *G09G 2320/046* (2013.01); *G09G 2340/0407* (2013.01)

(58) Field of Classification Search
CPC ........... G09G 3/3208; G09G 2320/046; G09G 2340/0407; G09G 3/006; G09G 3/20;
(Continued)

(56) References Cited

U.S. PATENT DOCUMENTS 10,699,622 B2 6/2020 Thompson et al.
11,151,917 B1 10/2021 Kim et al.
(Continued)

FOREIGN PATENT DOCUMENTS

JP 2017-107136 A 6/2017
KR 10-2007-0106895 A 11/2007
(Continued)

OTHER PUBLICATIONS

Korean Office Action dated Dec. 9, 2024, issued in Korean Patent Application No. 10-2021-0077488.
(Continued)

*Primary Examiner* — Hong Zhou
(74) *Attorney, Agent, or Firm* — Jefferson IP Law, LLP

(57) ABSTRACT

An electronic device and a method for predicting and compensating for a residual image on a display are provided. The electronic device includes a display comprising a plurality of first pixels and a plurality of second pixels, a memory, and a processor. The processor configured to generate an image to be displayed through the display, group the image into a first image corresponding to the first pixels, and a second image corresponding to the second pixels, generate a first burn-in map by analyzing the first image, generate a second burn-in map by analyzing the second image, store the first burn-in map in a first memory region of the memory, store the second burn-in map in a second memory region of the memory, and display, through the
(Continued)

display, the image having a burn-in or a residual image compensated for using the first burn-in map and the second burn-in map.

19 Claims, 14 Drawing Sheets

(58) Field of Classification Search
CPC ........ G09G 3/00; G09G 3/3233; G09G 5/391; G09G 2320/0257; G09G 2320/041; G09G 2320/043; G09G 2340/04; G06T 7/11; G06T 11/00
See application file for complete search history.

(56) References Cited

U.S. PATENT DOCUMENTS

| | | | | |
|---|---|---|---|---|
| 2011/0242074 | A1 | 10/2011 | Bert et al. | |
| 2012/0133683 | A1* | 5/2012 | Goden | G09G 3/3233 345/77 |
| 2016/0210473 | A1* | 7/2016 | Cohen | G06F 21/60 |
| 2018/0090102 | A1* | 3/2018 | Chappalli | G09G 5/003 |
| 2019/0080666 | A1 | 3/2019 | Chappalli et al. | |
| 2019/0156746 | A1 | 5/2019 | Kim et al. | |
| 2019/0189050 | A1 | 6/2019 | Choi et al. | |
| 2019/0206315 | A1 | 7/2019 | Park et al. | |
| 2019/0236757 | A1* | 8/2019 | Wang | G06T 3/4092 |
| 2019/0384438 | A1 | 12/2019 | Park et al. | |
| 2020/0090565 | A1 | 3/2020 | Sawahata | |
| 2020/0111455 | A1* | 4/2020 | Lee | G09G 5/373 |
| 2020/0175246 | A1 | 6/2020 | Park | |
| 2020/0265779 | A1 | 8/2020 | In | |
| 2020/0286447 | A1 | 9/2020 | Hei et al. | |
| 2022/0093059 | A1* | 3/2022 | Yang | G09G 5/10 |

FOREIGN PATENT DOCUMENTS

| | | | |
|---|---|---|---|
| KR | 10-1675852 | B1 | 11/2016 |
| KR | 10-2018-0013189 | A | 2/2018 |
| KR | 10-2018-0037861 | A | 4/2018 |
| KR | 10-2019-0081471 | A | 7/2019 |
| KR | 10-2019-0141518 | A | 12/2019 |
| KR | 10-2020-0065324 | A | 6/2020 |
| KR | 10-2020-0102032 | A | 8/2020 |
| KR | 10-2020-0113532 | A | 10/2020 |
| KR | 10-2257370 | B1 | 5/2021 |

OTHER PUBLICATIONS

International Search Report dated Sep. 7, 2022, issued in International Patent Application No. PCT/KR2022/007766.

* cited by examiner

FIG. 1

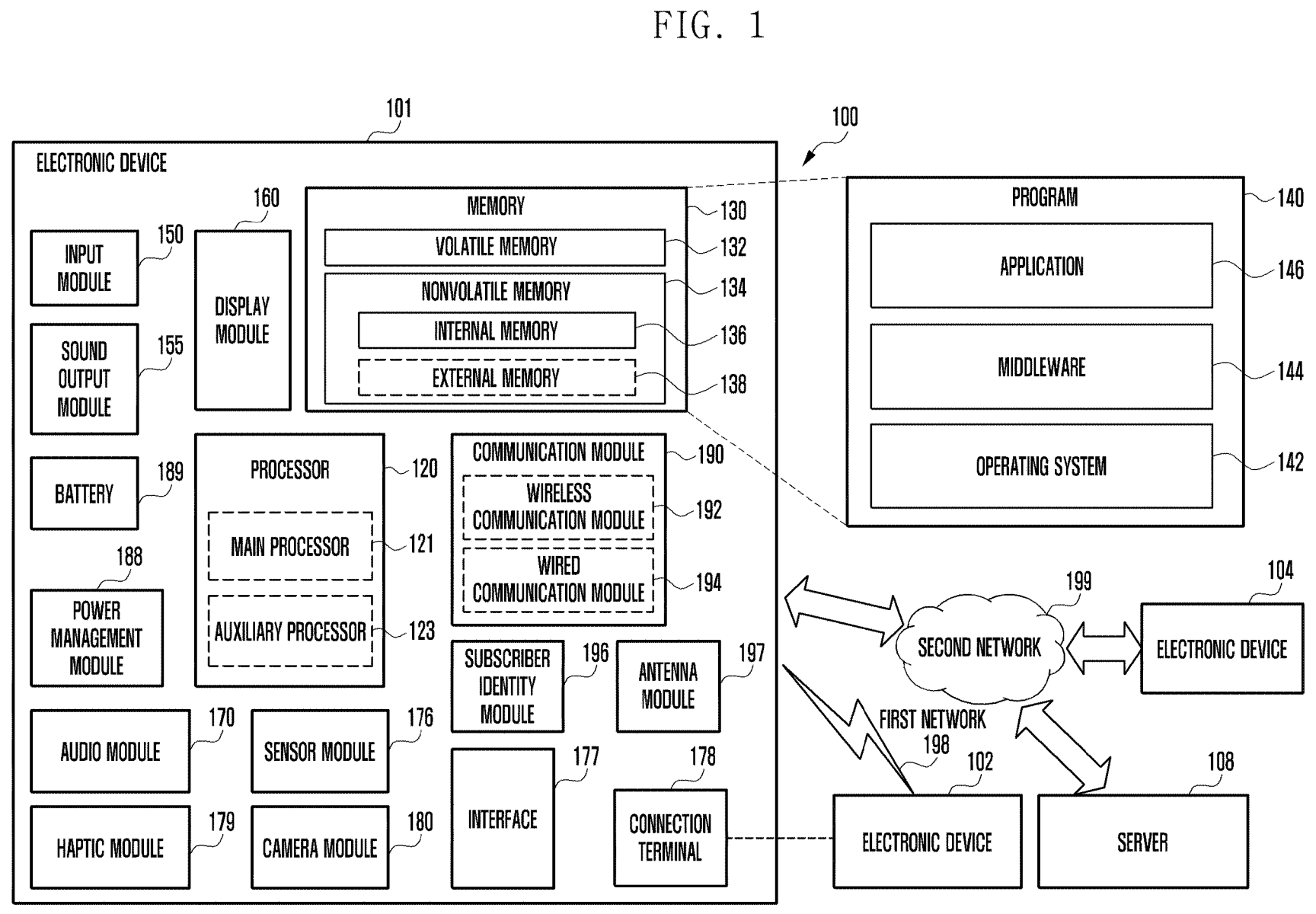

100
101
ELECTRONIC DEVICE
150 INPUT MODULE
155 SOUND OUTPUT MODULE
189 BATTERY
188 POWER MANAGEMENT MODULE
160 DISPLAY MODULE
120 PROCESSOR
121 MAIN PROCESSOR
123 AUXILIARY PROCESSOR
130 MEMORY
132 VOLATILE MEMORY
134 NONVOLATILE MEMORY
136 INTERNAL MEMORY
138 EXTERNAL MEMORY
190 COMMUNICATION MODULE
192 WIRELESS COMMUNICATION MODULE
194 WIRED COMMUNICATION MODULE
197 ANTENNA MODULE
196 SUBSCRIBER IDENTITY MODULE
170 AUDIO MODULE
179 HAPTIC MODULE
176 SENSOR MODULE
180 CAMERA MODULE
177 INTERFACE
178 CONNECTION TERMINAL
140 PROGRAM
146 APPLICATION
144 MIDDLEWARE
142 OPERATING SYSTEM
199 SECOND NETWORK
198 FIRST NETWORK
104 ELECTRONIC DEVICE
108 SERVER
102 ELECTRONIC DEVICE

FIG. 3
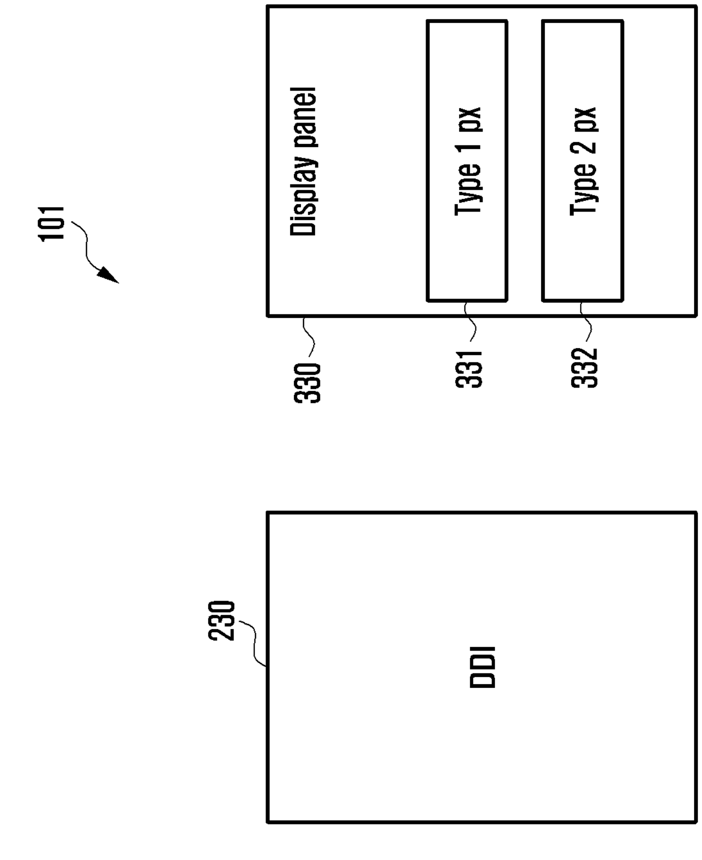
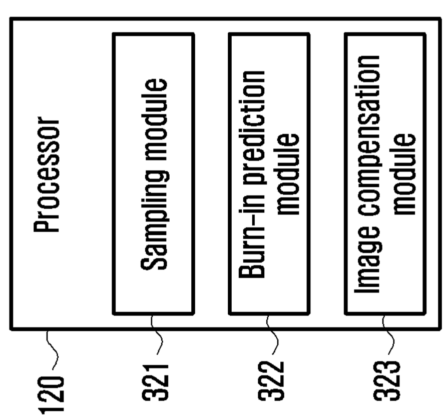

-y
-X
z
-z
x
y
w3
w1
w2
510
530a
331
331a
530
530b
101
180
510b
510a
520
332a
332

ELECTRONIC DEVICE AND METHOD FOR PREDICTING AND COMPENSATING FOR RESIDUAL IMAGE ON DISPLAY

CROSS-REFERENCE TO RELATED APPLICATION(S)

This application is a continuation application, claiming priority under § 365(c), of an International application No. PCT/KR2022/007766, filed on May 31, 2022, which is based on and claims the benefit of a Korean patent application number 10-2021-0077488, filed on Jun. 15, 2021, in the Korean Intellectual Property Office, the disclosure of which is incorporated by reference herein in its entirety.

BACKGROUND

1. Field

The disclosure relates to an electronic device and method for predicting and compensating for a residual image in a display.

2. Description of Related Art

Organic light emitting diodes (OLEDs) may be applied to displays of electronic devices. For example, a display mounted on an electronic device may include a display panel with flexible features, and pixels of the display panel may include an OLED.

The above information is presented as background information only to assist with an understanding of the disclosure. No determination has been made, and no assertion is made, as to whether any of the above might be applicable as prior art with regard to the disclosure.

SUMMARY

A display panel including an OLED occurs a residual image or burn-in phenomenon on a screen according to the following conditions. The residual image on the display panel occurs due to hysteresis characteristics of a thin film transistor disposed in a pixel. Burn-in of the display panel occurs due to a variation in an OLED driving time (e.g., cumulative light emission time) for respective plurality of pixels.

Aspects of the disclosure are to address at least the above-mentioned problems and/or disadvantages and to provide at least the advantages described below. Accordingly, an aspect of the disclosure is to provide an electronic device and method for predicting and/or compensating for in advance a residual image or burn-in phenomenon of the flexible display.

Additional aspects will be set forth in part in the description which follows and, in part, will be apparent from the description, or may be learned by practice of the presented embodiments.

In accordance with an aspect of the disclosure, an electronic device is provided. The electronic device includes a display including a plurality of first pixels and a plurality of second pixels, a memory, and a processor, wherein the processor is configured to generate an image to be displayed through the display, group the image into a first image corresponding to the first pixels and a second image corresponding to the second pixels, analyze the first image to generate a first burn-in map, analyze the second image to generate a second burn-in map, store the first burn-in map in a first memory area of the memory, store the second burn-in map in a second memory area of the memory, and display an image for which burn-in or residual image has been compensated through the display using the first burn-in map and the second burn-in map.

In accordance with another aspect of the disclosure, a method for an electronic device to compensate for burn-in or residual image is provided. The method includes generating an image to be displayed through a display, grouping the image into a first image corresponding to a plurality of first pixels of the display and a second image corresponding to a plurality of second pixels of the display, analyzing the first image to generate a first burn-in map, analyzing the second image to generate a second burn-in map, storing the first burn-in map in a first memory area of a memory, storing the second burn-in map in a second memory area of the memory, and displaying an image for which burn-in or residual image has been compensated through the display using the first burn-in map and the second burn-in map.

An electronic device and method according to various embodiments of this document can reduce defects, such as a residual image or stain on a screen by predicting and/or compensating for in advance a residual image or burn-in phenomena of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram illustrating an electronic device in a network environment according to an embodiment of the disclosure;

FIG. 3 is a block diagram illustrating an electronic device according to an embodiment of the disclosure;

Throughout the drawings, it should be noted that like reference numbers are used to depict the same or similar elements, features, and structures.

DETAILED DESCRIPTION

Figure 2:
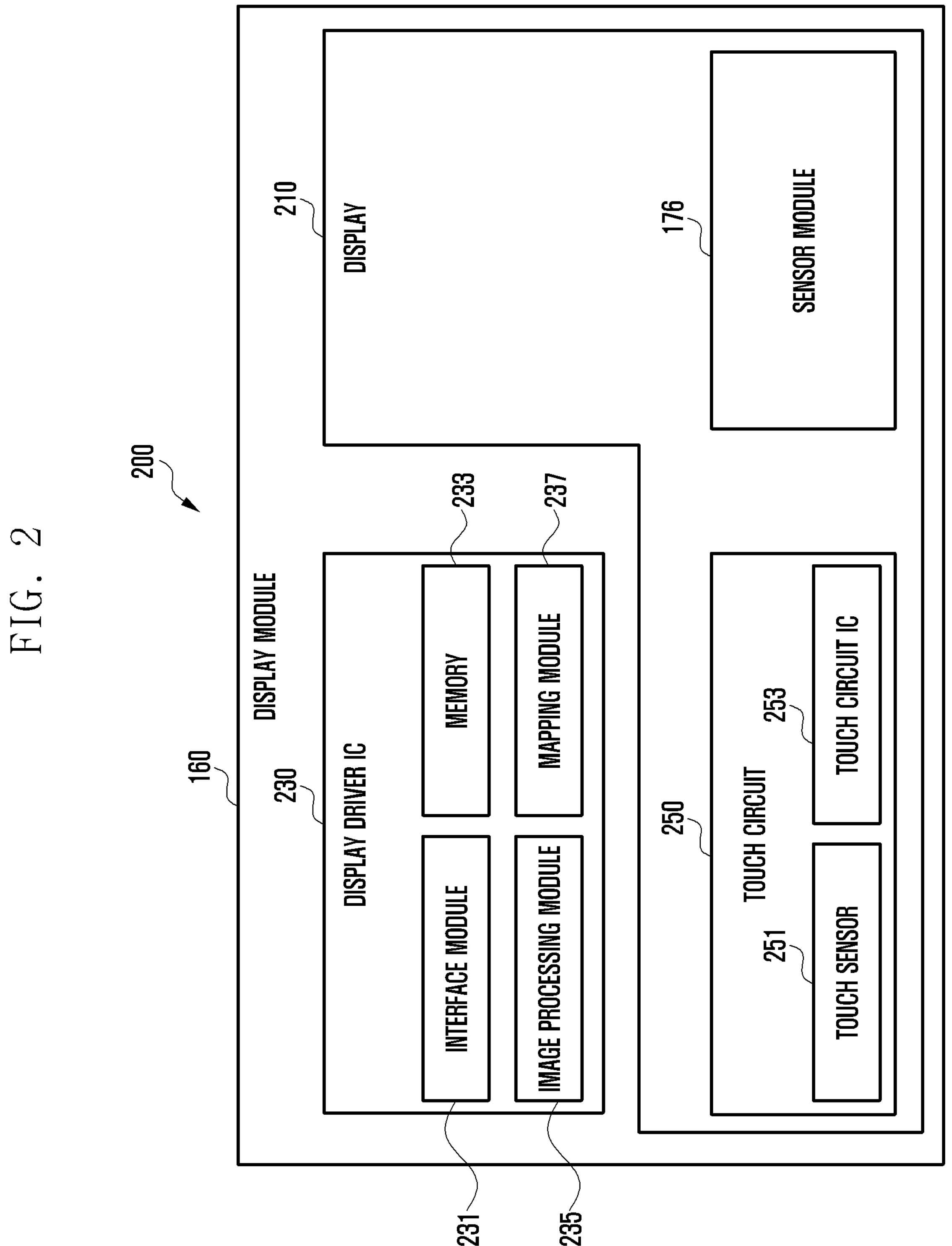
FIG. 2 is a block diagram illustrating a display module according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

FIG. 2 is a block diagram 200 of a display module according to an embodiment of the disclosure.

Referring to FIG. 2, the display module 160 may include a display 210 and a display driver integrated circuit (DDI) 230 for controlling the display 210. The DDI 230 may include an interface module 231, a memory 233 (e.g., a buffer memory), an image processing module 235, or a mapping module 237. For example, the DDI 230 may receive image information including image data or an image control signal corresponding to a command for controlling the image data from other components of the electronic device 101 through the interface module 231. For example, according to an embodiment of the disclosure, the image information may be received from the processor 120 (e.g., the main processor 121 (e.g., application processor) or an auxiliary processor 123 (e.g., a graphics processer) that operates independently of a function of the main processor 121. The DDI 230 may communicate with the touch circuit 250 or the sensor module 176 through the interface module 231. Further, the DDI 230 may store at least a portion of the received image information, for example, in frame units in the memory 233. The image processing module 235 may perform, for example, preprocessing or postprocessing (e.g., resolution, brightness, or size adjustment) of at least a portion of the image data based at least on characteristics of the image data or characteristics of the display 210. The mapping module 237 may generate a voltage value or a current value corresponding to the preprocessed or postprocessed image data through the image processing module 235. According to an embodiment of the disclosure, the generation of the voltage value or the current value may be performed, for example, based on at least a part of an attribute (e.g., pixel array (RGB stripe or pentile structure), or the size of each subpixel) of pixels of the display 210. As at least some pixels of the display 210 are driven, for example, based on at least a part of the voltage value or the current value, visual information (e.g., text, image, or icon) corresponding to the image data may be displayed through the display 210.

According to an embodiment of the disclosure, the display module 160 may further include a touch circuit 250. The touch circuit 250 may include a touch sensor 251 and a touch sensor integrated circuit (IC) 253 for controlling the touch sensor 251. For example, in order to detect a touch input or a hovering input for a specific position of the display 210, the touch sensor IC 253 may control the touch sensor 251. For example, the touch sensor IC 253 may measure a change in a signal (e.g., voltage, light amount, resistance, or charge amount) for a specific position of the display 210, thereby detecting a touch input or a hovering input. The touch sensor IC 253 may provide information (e.g., location, area, pressure, or time) on the detected touch input or hovering input to the processor 120. According to an embodiment of the disclosure, at least a portion (e.g., the touch sensor IC 253) of the touch circuit 250 may be included as the display driver IC 230, a part of the display 210, or a part of other components (e.g., the auxiliary processor 123) disposed outside the display module 160.

According to an embodiment of the disclosure, the display module 160 may further include at least one sensor (e.g., fingerprint sensor, iris sensor, pressure sensor, or illumination sensor) of the sensor module 176, or a control circuit therefor. In this case, the at least one sensor or the control circuit therefor may be embedded in a part (e.g., the display 210 or the DDI 230) of the display module 160 or a part of the touch circuit 250. For example, in the case that the sensor module 176 embedded in the display module 160 includes a biometric sensor (e.g., fingerprint sensor), the biometric sensor may acquire biometric information (e.g., fingerprint image) associated with a touch input through a partial area of the display 210. For another example, in the case that the sensor module 176 embedded in the display module 160 includes a pressure sensor, the pressure sensor may acquire pressure information associated with a touch input through a partial area or an entire area of the display 210. According to an embodiment of the disclosure, the touch sensor 251 or the sensor module 176 may be disposed between pixels of a pixel layer of the display 210, or over or under the pixel layer.

An electronic device (e.g., the electronic device 101 of FIG. 1) according to various embodiments may include a display (e.g., the display 210 of FIG. 2) including a plurality of first pixels (e.g., first pixels 331 of FIG. 3) and a plurality of second pixels (e.g., second pixels 332 of FIG. 3), a memory (e.g., the memory 233 of FIG. 2 or the memory 130 of FIG. 1), and a processor 120, wherein the processor 120 may generate an image to be displayed through the display 210, group the image into a first image corresponding to the first pixels 331 and a second image corresponding to the second pixels 332, analyze the first image to generate a first burn-in map, analyze the second image to generate a second burn-in map, store the first burn-in map in a first memory 233 area of the memory 233, store the second burn-in map in a second memory 233 area of the memory 233, and display an image in which burn-in or residual image has been compensated through the display 210 using the first burn-in map and the second burn-in map.

According to an embodiment of the disclosure, the plurality of first pixels 331 and the plurality of second pixels 332 may have different characteristics.

According to an embodiment of the disclosure, the characteristics may include at least one of a pixel structure, a pixel size, a pixel array, a pixel aperture ratio, pixel brightness, a pixel resolution (e.g., pixels per inch (PPI)), a pixel lifespan, or distribution in which pixels are located in the display 210 panel.

According to an embodiment of the disclosure, the processor 120 may downsample the first image to a first resolution and downsample the second image to a second resolution.

According to an embodiment of the disclosure, the processor 120 may store the first burn-in map in a size of n bits, and store the second burn-in map in a size of m bits different from the n bits.

According to an embodiment of the disclosure, the first pixels 331 may be pixels for displaying the image at a viewing angle in a first angle range, and the second pixels 332 may be pixels for displaying the image at a viewing angle in a second angle range smaller than the first angle range.

According to an embodiment of the disclosure, the first pixels 331 may be pixels disposed not to overlap the camera module (e.g., the camera module 180 of FIG. 1) of the electronic device 101, and the second pixels 332 may be pixels disposed to overlap at least a portion of the camera module 180.

According to an embodiment of the disclosure, the display 210 may include a first part (e.g., a first part 530*a* of FIG. 6) that is fixedly and visually exposed from the outside, and a second part (e.g., a second part 530*b* of FIG. 6) configured to slide into the inside of housings 510 and 520 and visually exposed from the outside based on the movement of a housing (e.g., the housings 510 and 520 of FIG. 5) of the electronic device 101, and the first pixels 331 may be pixels disposed in the first part 530*a*, and the second pixels 332 may be pixels disposed in the second part 530*b*.

According to an embodiment of the disclosure, the processor 120 may generate the first burn-in map based on a first lifespan characteristic curve corresponding to characteristics of the first pixels 331, and generate the second burn-in map based on a second lifespan characteristic curve corresponding to characteristics of the second pixels 332.

According to an embodiment of the disclosure, the processor 120 may analyze an aging factor of the first image to generate a first burn-in map and analyze an aging factor of the second image to generate a second burn-in map.

According to an embodiment of the disclosure, the aging factor may include at least one of brightness, a temperature, or a cumulative emission time of the OLED.

A method for the electronic device 101 according to various embodiments to compensate for burn-in or residual image may include generating an image to be displayed through the display 210, grouping the image into a first image corresponding to the first pixels 331 of the display 210 and a second image corresponding to the second pixels 332 of the display 210, analyzing the first image to generate a first burn-in map, analyzing the second image to generate a second burn-in map, storing the first burn-in map in a first memory 233 area of the memory 233, storing the second burn-in map in a second memory 233 area of the memory 233, and displaying an image for which burn-in or residual image is compensated through the display 210 using the first burn-in map and the second burn-in map.

According to an embodiment of the disclosure, the plurality of first pixels 331 and the plurality of second pixels 332 may have different characteristics.

According to an embodiment of the disclosure, the characteristics may include at least one of a pixel structure, a size of one pixel, a pixel array, a pixel aperture ratio, pixel brightness, a pixel resolution (e.g., pixels per inch (PPI)), a pixel lifespan, or distribution in which pixels are located in the display 210 panel.

According to an embodiment of the disclosure, the method may further include downsampling the first image to a first resolution and downsampling the second image to a second resolution.

According to an embodiment of the disclosure, the method may further include storing the first burn-in map in a size of n bits, and storing the second burn-in map in a size of m bits different from the n bits.

According to an embodiment of the disclosure, the first pixels 331 may be pixels for displaying the image at a viewing angle in a first angle range, and the second pixels 332 may be pixels for displaying the image at a viewing angle in a second angle range smaller than the first angle range.

According to an embodiment of the disclosure, the first pixels 331 may be pixels disposed not to overlap the camera module 180 of the electronic device 101, and the second pixels 332 may be pixels disposed to overlap at least a portion of the camera module 180.

According to an embodiment of the disclosure, the display 210 may include a first part 530*a* fixed and visually exposed from the outside and a second part 530*b* configured to slide into the inside the housings 510 and 520 and visually exposed from the outside based on the movement of the housings 510 and 520 of the electronic device 101, and the first pixels 331 may be pixels disposed in the first part 530*a*, and the second pixels 332 may be pixels disposed in the second part 530*b*.

According to an embodiment of the disclosure, the method may further include generating the first burn-in map based on a first lifespan characteristic curve corresponding to characteristics of the first pixels 331 and generating the second burn-in map based on a second lifespan characteristic curve corresponding to characteristics of the second pixels 332.

FIG. 3 is a block diagram illustrating an electronic device according to an embodiment of the disclosure.

Referring to FIG. 3, an electronic device 101 according to various embodiments may include a processor 120, a DDI 230, and a display panel 330.

According to various embodiments of the disclosure, the display panel 330 may include first pixels 331 having a first type (or first characteristic), and second pixels 332 having a second type (or second characteristic) different from the first type. According to an embodiment of the disclosure, the first pixels 331 and the second pixels 332 may be divided into a first type (or first characteristic) and a second type (or second characteristic) according to a pixel structure, a size of one pixel, a pixel array, a pixel aperture ratio, pixel brightness, a pixel resolution (pixels per inch (PPI)), a pixel lifespan, and/or distribution in which pixels are located in the display panel 330. For example, the first pixels 331 and the second pixels 332 may have different characteristics. According to an embodiment of the disclosure, the characteristics may include at least one of a pixel structure, a size of one pixel, a pixel array, a pixel aperture ratio, pixel brightness, a pixel resolution (e.g., pixels per inch (PPI)), a pixel lifespan, and/or distribution in which pixels are located in the display panel 330.

According to an embodiment of the disclosure, as described later with reference to FIG. 4, the display panel 330 may include first pixels 331 for displaying an image in a general mode and second pixels 332 for displaying an image having a narrow viewing angle when a privacy protection mode is activated. In this case, the first pixels 331 and the second pixels 332 may have different pixel sizes. For example, the size of one first pixel 331*a* may be larger than that of one second pixel 332*a*.

According to another embodiment of the disclosure, as described later with reference to FIGS. 5 and 6, the display panel 330 may be applied to the electronic device 101 of a form factor in which at least a portion of the housings 510 and 520 may slidably move, and may be a display panel 330 whose display area is variably changed in conjunction with the sliding movement of at least a portion of the housings 510 and 520. In another embodiment of the disclosure, the display panel 330 may include first pixels 331 disposed in the first part 530*a* of the display 530 that fixedly displays an image regardless of the movement of the housings 510 and 520 and second pixels 332 disposed in the second part 530*b* of the display 530 variably exposed according to the movement of the housings 510 and 520. In this case, the first pixels 331 and the second pixels 332 may have different average use times, sizes of each pixel, pixel resolutions, and/or pixel lifespan characteristics. For example, the average use time of the first pixels 331 may be longer than that of the second pixels 332. For example, the resolution (e.g., PPI) of the first pixels 331 may be smaller than that of the second pixels 332. For example, the lifespan characteristics of the first pixels 331 may be higher than those of the second pixels 332. For example, the resolution of the first pixels 331 and the resolution of the second pixels 332 may be the same (e.g., the pixel pitch is the same), and the size of one first pixel 331*a* and the size of one second pixel 332 may be different. For example, the size of one first pixel 331*a* may be larger than that of one second pixel 332*a*.

According to another embodiment of the disclosure, as described later with reference to FIG. 7, the display panel 330 may be applied to the electronic device 101 including an optical sensor module (e.g., fingerprint sensor or illumination sensor) disposed to at least partially overlap an under display camera (UDC) or a display area (e.g., an active area) of the display panel 330. In another embodiment of the disclosure, the display panel 330 may include first pixels 331 disposed in a first part A1 of the display panel 330 that does not overlap the camera module (or an optical sensor module (e.g., a fingerprint sensor or an illuminance sensor)) and second pixels 332 disposed in a second part A2 of the display panel 330 overlapped with at least a portion of the camera module 180 (e.g., an optical sensor module (e.g., a fingerprint sensor, or an illuminance sensor)). In this case, the first pixels 331 and the second pixels 332 may have different pixel resolutions, pixel brightness, and/or pixel lifespan characteristics. For example, the resolution (e.g., pixels per inch (PPI)) of the first pixels 331 may be greater than that of the second pixels 332. For example, the brightness of the first pixels 331 may be darker than that of the second pixels 332. For example, the lifespan characteristics of the first pixels 331 may be higher than those of the second pixels 332.

According to various embodiments of the disclosure, by performing independently sampling, burn-in prediction, burn-in map generation, and/or image compensation for burn-in for the first pixels 331 and the second pixels 332 having different characteristics, the processor 120 may implement more accurate image compensation and reduce a memory use amount by reducing an amount of data computation and accumulated data.

According to various embodiments of the disclosure, the processor 120 may include a sampling module 321, a burn-in prediction module 322, and/or an image compensation module 323, at least some of which may be omitted. According to various embodiments of the disclosure, the processor 120 may further include a module for performing at least some operations of the processor 120 described in this document in addition to the sampling module 321, the burn-in prediction module 322, and the image compensation module 323. According to various embodiments of the disclosure, at least a portion of operations performed by the sampling module 321, the burn-in prediction module 322, and/or the image compensation module 323 of the processor 120 may be performed by the DDI 230.

According to an embodiment of the disclosure, the sampling module 321 may acquire an aging factor for at least some of the first pixels 331 and at least some of the second pixels 332 at a designated period. According to an embodiment of the disclosure, the sampling module 321 may configure a sampling period for the first pixels 331 and a sampling period for the second pixels 332 to be the same as or different from each other. According to an embodiment of the disclosure, the sampling module 321 may configure differently a sampling resolution (e.g., downsampling) for the first pixels 331 and a sampling resolution (e.g., downsampling) for the second pixels 332, which may make it easier to secure a memory space by reducing an amount of computation and accumulated data.

According to an embodiment of the disclosure, the sampling module 321 is the aging factor and may acquire a first image displayed through the first pixels 331, a second image displayed through the second pixels 332, brightness, a temperature, and/or a cumulative emission time of the OLED.

According to an embodiment of the disclosure, the burn-in prediction module 322 may predict the degree of burn-in on at least a portion of the display panel 330 in which the first pixels 331 are disposed based on an aging factor acquired from at least some of the first pixels 331. According to an embodiment of the disclosure, in order to predict the degree of burn-in, the burn-in prediction module 322 may refer to a first lifespan characteristic curve 1101 (e.g., a first lifespan characteristic curve of FIG. 11) for the first pixels 331 of the first type. According to an embodiment of the disclosure, the burn-in prediction module 322 may generate a first compensation map based on the degree of burn-in predicted for the first pixels 331.

According to an embodiment of the disclosure, the burn-in prediction module 322 may predict the degree of burn-in on another portion of the display panel 330 in which the second pixels 332 are disposed based on an aging factor acquired from at least some of the second pixels 332. According to an embodiment of the disclosure, in order to predict the degree of burn-in, the burn-in prediction module 322 may refer to a second lifespan characteristic curve (e.g., a second lifespan characteristic curve 1102 of FIG. 11) for the second pixels 332 of the second type. Here, the second lifespan characteristic curve may be different from the first lifespan characteristic curve. According to an embodiment of the disclosure, the burn-in prediction module 322 may generate a second compensation map based on the degree of predicted burn-in for the second pixels 332.

According to an embodiment of the disclosure, the burn-in prediction module 322 may store the first compensation map and the second compensation map in different memories. For example, the burn-in prediction module 322 may store the first compensation map in a first memory area and the second compensation map in a second memory area. According to some embodiments of the disclosure, the burn-in prediction module 322 may store the first compensation map and the second compensation map in different physically separate memories. For example, the electronic device 101 may include a first graphics memory (e.g., GRAM1) and a second graphics memory (e.g., GRAM2), and store a first compensation memory in the first graphics memory (e.g., GRAM1) and the second compensation map in a second graphics memory (e.g., GRAM2).

According to an embodiment of the disclosure, the image compensation module 323 may compensate (e.g., convert) an image to be displayed through the display panel 330 based on the first compensation map and the second compensation map, and control the display panel 330 to display the compensated image. For example, the image compensation module 323 may compensate for a first image to be displayed through the first pixels 331 based on the first compensation map and compensate for a second image to be displayed through the second pixels 332 based on the second compensation map, thereby compensating for the entire image.

In the case that the display panel 330 includes first pixels 331 and second pixels 332 having different characteristics, the electronic device 101 according to various embodiments may independently perform burn-in prediction for the first pixels 331 and the second pixels 332 and burn-in prediction for the second pixels 332, and independently store the first compensation map and the second compensation map according to the burn-in prediction in different memory areas or different physically separate memories. The electronic device 101 according to various embodiments may correct an image according to a first compensation map and a second compensation map that are independently calculated and stored, thereby enabling more accurate burn-in compensation.

Figure 4:
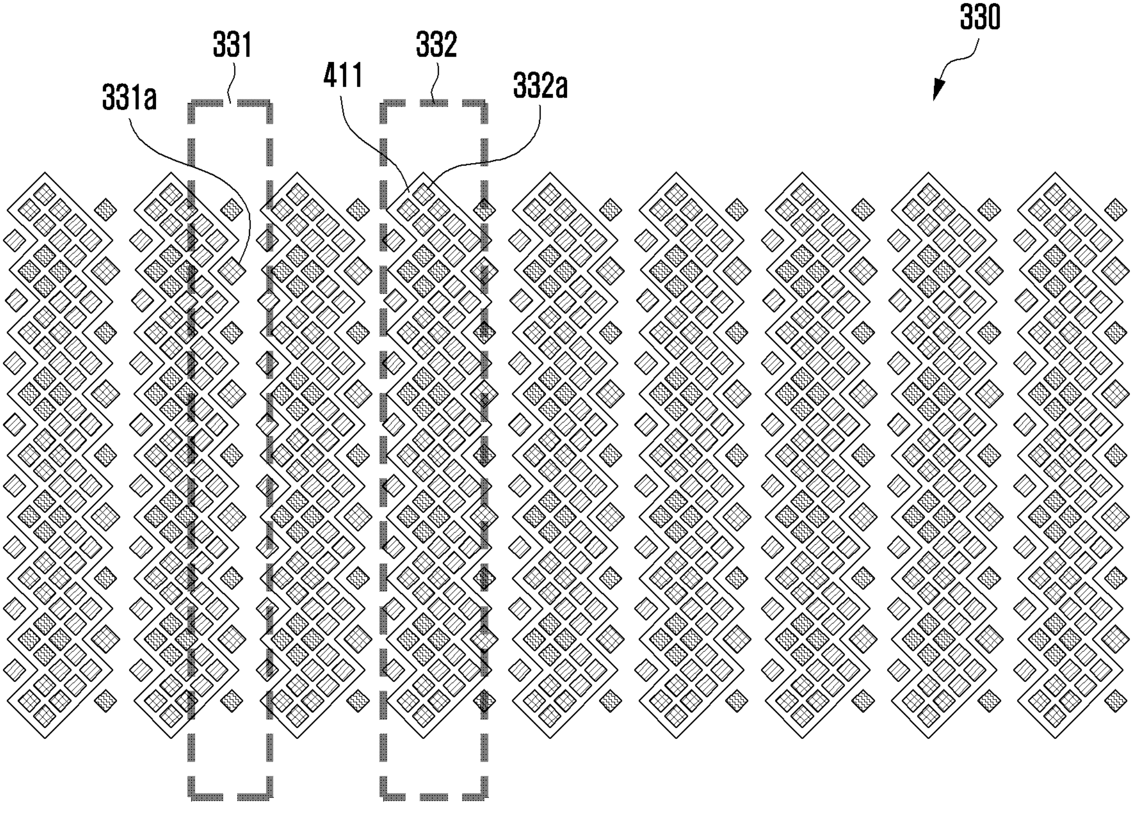
FIG. 4 illustrates schematically illustrating a portion of a display panel according to an embodiment of the disclosure.

FIG. 4 illustrates schematically illustrating a portion of a display panel according to an embodiment of the disclosure.

Referring to FIG. 4, according to an embodiment of the disclosure, the display panel 330 may include first pixels 331 for displaying an image in a general mode and second pixels 332 for displaying an image with a narrow viewing angle when a privacy protection mode is activated. According to an embodiment of the disclosure, each of the second pixels 332 may be enclosed by an opaque member 411. For example, a portion of the display panel 330 in which the second pixels 332 are disposed may include an opaque member 411 enclosing each second pixel. According to an embodiment of the disclosure, the opaque member 411 may function as a partition or a cover for lowering a viewing angle of an image output from each second pixel 332*a*. For example, light output from each second pixel 332*a* in a range of a designated angle or more may be blocked by the opaque member 411, and accordingly, images output from each second pixel 332*a* may have a narrow viewing angle.

In an embodiment of the disclosure, in the case that a privacy protection mode is activated, because lifespan characteristics between adjacently disposed pixels (e.g., first pixels 331 and/or second pixels 332) are different, the electronic device 101 may operate to compensate for a residual image or burn-in by grouping (e.g., interlacing or de-interlacing) pixels within the first pixels 331 and/or the second pixels 332. For example, the electronic device 101 may interlace (e.g., operation 1221 of FIG. 12) and/or de-interlace (e.g., operation 821 of FIG. 8) the first pixels 331 and/or the second pixels 332 to generate a burn-in map and a compensation map corresponding to a structure and lifespan characteristics of pixels. Further, the first pixels 331 and the second pixels 332 may be disposed differently from that in FIG. 4 and various embodiments of this document may not be limited to the illustrated example.

According to an embodiment of the disclosure, the first pixels 331 and the second pixels 332 may have different characteristics. For example, a size of one first pixel 331*a* may be larger than that of one second pixel 332*a*.

As described later with reference to FIGS. 8 to 14, by independently performing sampling, burn-in prediction, burn-in map generation, and/or image compensation for burn-in on the first pixels 331 and the second pixels 332 having different characteristics, the electronic device 101 according to various embodiments may implement more accurate image compensation and reduce a memory use amount by reducing an amount of data computation and accumulated data.

Figure 5:
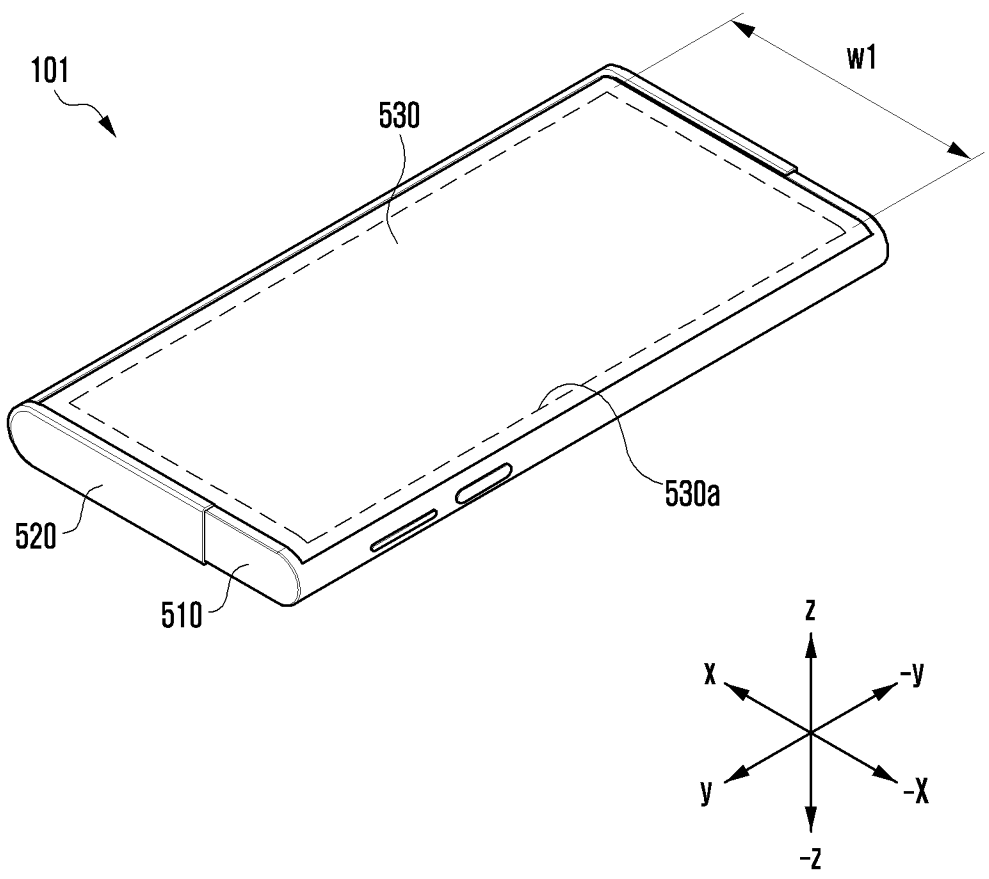
FIG. 5 is a perspective view illustrating a first state (e.g., a slide-in state) of an electronic device according to an embodiment of the disclosure.

FIG. 5 is a perspective view illustrating a first state (e.g., a slide-in state) of an electronic device according to an embodiment of the disclosure.

Figure 6:
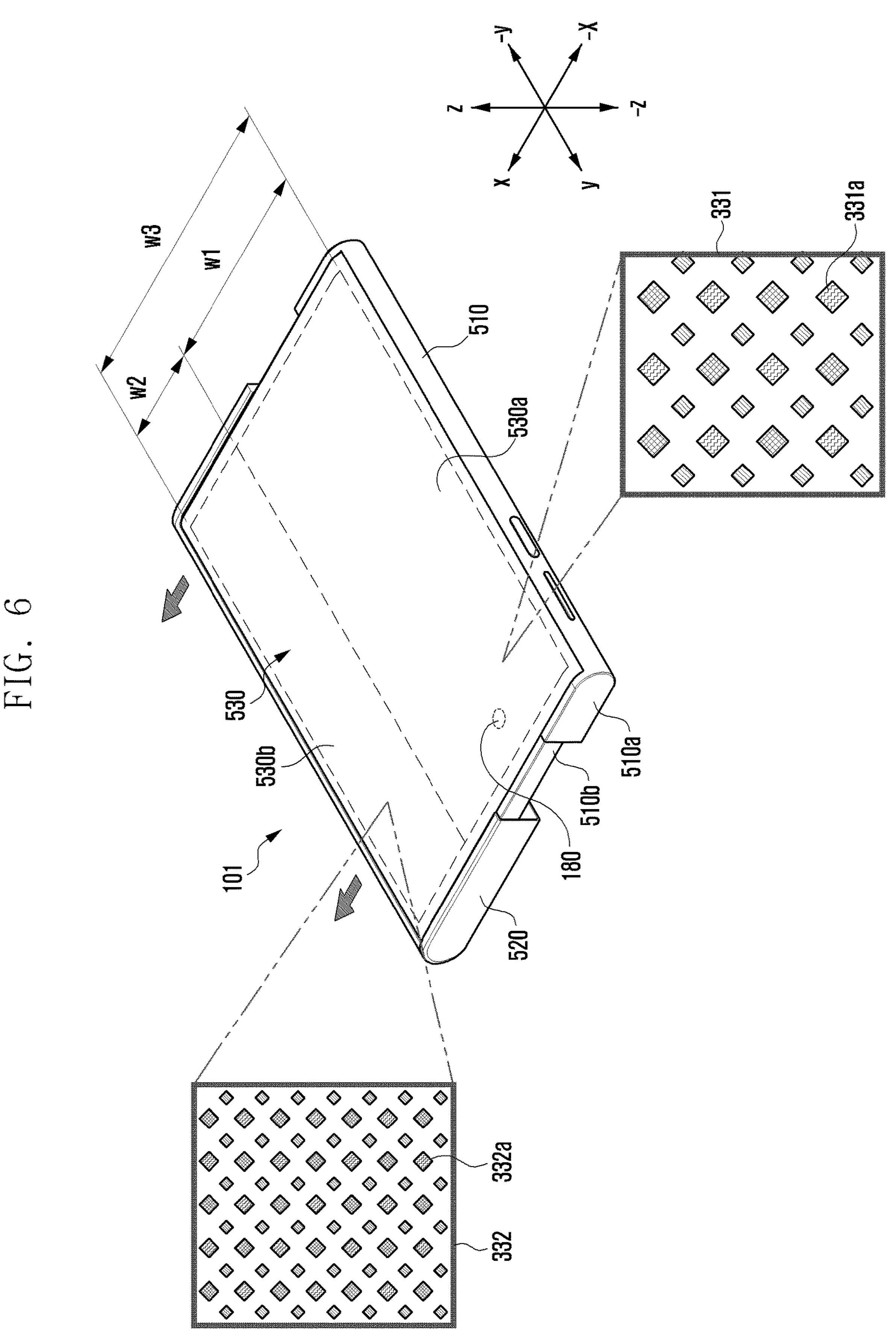
FIG. 6 is a perspective view of an electronic device illustrating a second state (e.g., a slide-out state) of the electronic device illustrated in FIG. 5 according to an embodiment of the disclosure.

FIG. 6 is a perspective view of an electronic device illustrating a second state (e.g., a slide-out state) of an electronic device illustrated in FIG. 5 according to an embodiment of the disclosure.

Referring to FIGS. 5 and 6, a first state of the electronic device 101 according to an embodiment may be referred to as a first shape, and a second state thereof may be referred to as a second shape. For example, the first shape may include a normal state, a reduced state, a retracted state, a closed state, or a slide-in state, and the second shape may include an extended state, an open state, or a slide-out state. According to an embodiment of the disclosure, the electronic device 101 may form a third state, which is a state between the first state and the second state. For example, the third state may be referred to as a third shape, and the third shape may include a free stop state.

According to an embodiment of the disclosure, the electronic device 101 may include a first housing 510 and a second housing 520. According to an embodiment of the disclosure, the second housing 520 may move in a designated direction, for example, a first direction (e.g., x direction) from the first housing 510. For example, the second housing 520 may slide by a designated distance (e.g., a second width w2) in the first direction (e.g., x direction) from the first housing 510. According to an embodiment of the disclosure, the second housing 520 may reciprocate by a designated distance (e.g., the second width w2) in the first direction (e.g., x direction) and the second direction (−x direction) from the first housing 510.

According to an embodiment of the disclosure, a state in which the second housing 520 slides in the first direction (e.g., x direction) from the first housing 510 may be defined as a second state (e.g., expanded state)(or slide-out state) of the electronic device 101. According to an embodiment of the disclosure, a state in which the second housing 520 is slid in a direction, for example, a second direction (e.g., −x direction) opposite to the first direction (e.g., x direction) of the first housing 510 may be defined as a first state (e.g., contracted state) (or slide-in state) of the electronic device 101.

According to an embodiment of the disclosure, the electronic device 101 may be referred to as a slideable electronic device 101 as the second housing 520 may slide, or at least a portion of a flexible display 530 may be referred to as a rollable electronic device 101 as it is designed to be rolled up inside the second housing 520 (or the first housing 510) based on the slide movement of the second housing 520.

According to an embodiment of the disclosure, in the electronic device 101, the second housing 520 may be coupled to the first housing 510 so that the second housing 520 may at least partially slide from the first housing 510.

According to an embodiment of the disclosure, the first housing 510 of the electronic device 101 may include lateral members 510*a* and 510*b* enclosing a side surface of the electronic device 101. According to an embodiment of the disclosure, the lateral members 510*a* and 510*b* of the first housing 510 may include a first lateral member 510*a* exposed to the outside in the first state (e.g., a contracted state) and/or the second state (e.g., an expanded state) of the electronic device 101 without being inserted into the inside of the second housing 520, and a second lateral member 510*b* whose at least a portion is inserted into and/or drawn out from an internal space of the second housing 520 through one side surface of the second housing 520. For example, the second lateral member 510*b* of the first housing 510 may be not visually exposed to the outside in the first state (e.g., a contracted state), but may be visually exposed to the outside in the second state (e.g., an expanded state).

According to an embodiment of the disclosure, the second housing 520 may support a portion (e.g., the second part 530*b*) of the flexible display 530 during the second state, and expand or reduce a display area of the flexible display 530 as the second housing 520 slides.

According to an embodiment of the disclosure, the flexible display 530 may include a first part 530*a* supported by the first housing 510, and a second part 530*b* extended from the first part 530*a*.

According to an embodiment of the disclosure, the second part 530*b* of the flexible display 530 may be introduced into an internal space of the second housing 520 (or the first housing 510), and be disposed not to be visually exposed to the outside when the electronic device 101 is in the first state (e.g., a contracted state), and be extended from the first part 530*a* to be visually exposed to the outside when the electronic device 101 is in the second state (e.g., an expanded state).

According to an embodiment of the disclosure, in the first state (e.g., a contracted state), the display area of the flexible display 530 may have a first width w1 by visually exposing the first part 530*a* of the flexible display 530.

According to an embodiment of the disclosure, a display area of the flexible display 530 in the second state (e.g., an expanded state) may have a third width w3 larger than the first width w1 by a second width w2 by exposing the first part 530*a* and the second part 530*b* of the flexible display 530. For example, in the second state (e.g., an expanded state), the display area of the flexible display 530 may be expanded by the second width w2, which is the maximum width of the second part 530*b*.

According to an embodiment of the disclosure, the electronic device 101 may include a camera module 180 or a sensor module (not illustrated) (e.g., the sensor module 176 of FIG. 1). According to an embodiment of the disclosure, the camera module 180 or the sensor module (not illustrated) may be disposed under the flexible display 530 (e.g., in the −z direction from the flexible display 530) and detect an external environment based on information (e.g., light) received by penetrating the flexible display 530.

According to an embodiment of the disclosure, the sensor module (not illustrated) may include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, an illumination sensor, a proximity sensor, or an ultrasonic sensor.

According to an embodiment of the disclosure, the camera module 180 may include one lens or two or more lenses (e.g., wide-angle lens, ultra-wide angle lens, or telephoto lens) and image sensors. In some embodiments of the disclosure, the camera module 180 may include an infrared (IR) camera (e.g., time of flight (TOF) camera, structured light camera), or a light detection and ranging (LiDAR) sensor. For example, the camera module 180 may include time of flight (TOF) lenses and/or an image sensor. According to an embodiment of the disclosure, the IR camera may operate as at least a portion of a sensor module (not illustrated), and the TOF camera may operate as at least a portion of the sensor module for detecting a distance to a subject.

According to an embodiment of the disclosure, the flexible display 530 may include first pixels 331 disposed in the first part 530*a* that fixedly displays an image regardless of the movement of the housings 510 and 520, and second pixels 332 disposed in the second part 530*b* variably exposed according to the movement of the housings 510 and 520. According to an embodiment of the disclosure, the first pixels 331 and the second pixels 332 may have different characteristics. According to an embodiment of the disclosure, in the first pixels 331 and the second pixels 332, at least one of an average use time, a size of each pixel, a pixel resolution, a pixel size, a pixel stacking structure, and/or a pixel lifespan characteristic may be different from each other. For example, the average use time of the first pixels 331 may be longer than that of the second pixels 332. For example, the resolution (e.g., PPI) of the first pixels 331 may be smaller than that of the second pixels 332. For example, lifespan characteristics of the first pixels 331 may be higher than those of the second pixels 332. For example, the resolution of the first pixels 331 and the resolution of the second pixels 332 are the same (e.g., the pixel pitch is the same), and the size of one first pixel 331*a* and the size of one second pixel 332*a* may be different. For example, the size of one first pixel 331*a* may be larger than that of one second pixel 332*a*.

As described later with reference to FIGS. 8 to 14, by independently performing performs sampling, burn-in prediction, burn-in map generation, and/or image compensation for burn-in on the first pixels 331 and the second pixels 332 having different characteristics, the electronic device 101 according to various embodiments may implement more accurate image compensation and reduce a memory use amount by reducing an amount of data computation and accumulated data.

Figure 7:
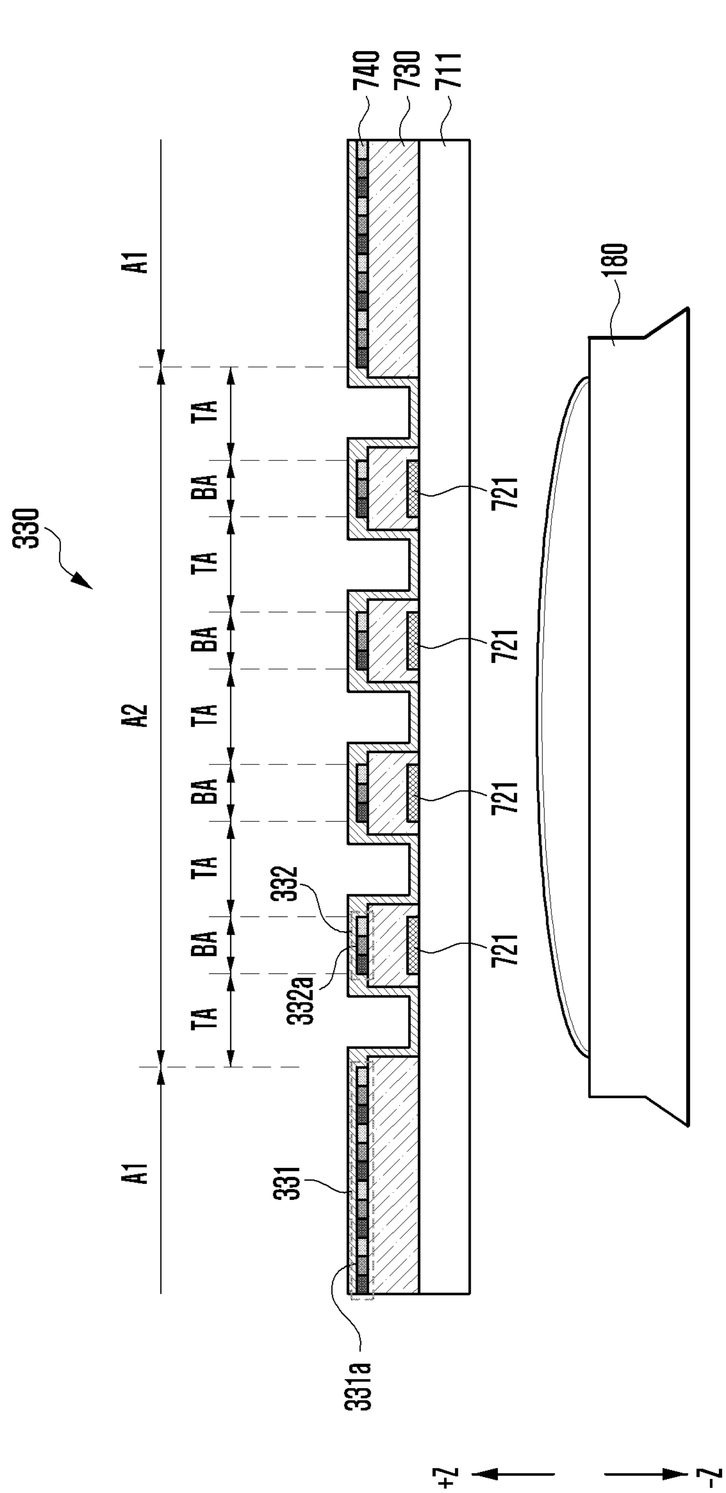
FIG. 7 is a cross-sectional view illustrating a portion of a display panel according to an embodiment of the disclosure.

FIG. 7 is a cross-sectional view illustrating a portion of a display panel according to an embodiment of the disclosure.

Referring to FIG. 7, the display panel 330 according to an embodiment may include a substrate 711, a black mask 721 formed in the z direction (e.g., upward direction) from the substrate 711, a thin film transistor (TFT) layer 730 (e.g., low temperature polycrystalline silicon (LTPS) TFT, low temperature polycrystalline oxide (LTPO) TFT, amorphous silicon (a-Si) TFT, or liquid crystalline polymer (LCP) TFT) formed in the z-direction from the substrate 711 including the black mask 721, and/or a pixel layer 740 formed in the z-direction from the TFT layer 730. Although not illustrated, an encapsulation layer or a polarizing layer (or a color filter layer) may be disposed in the z direction from the pixel layer 740.

According to an embodiment of the disclosure, a camera module 180 or an optical sensor module (not illustrated) (e.g., fingerprint sensor or illumination sensor) may be disposed under the display panel 330.

According to an embodiment of the disclosure, the display panel 330 may include a first part A1 that does not overlap the camera module 180, and a second part A2 disposed to overlap at least a portion of the camera module 180.

According to an embodiment of the disclosure, the first pixels 331 may be disposed in the pixel layer 740 in a stacked structure of the first part A1 of the display panel 330.

According to an embodiment of the disclosure, the second pixels 332 having different characteristics from those of the first pixels 331 may be disposed in the pixel layer 740 in a stacked structure of the second part A2 of the display panel 330.

According to an embodiment of the disclosure, a black mask 721 may be formed in at least a partial area that overlaps the second pixels 332 in the second part A2 of the display panel 330, and the black mask 721 may not be formed in an area that does not overlap the second pixels 332. According to an embodiment of the disclosure, the black mask 721 is for reducing unintended diffraction of light in the second part A2 of the display panel 330 that overlaps the camera module 180, and may form a transmission area (TA) having a designated pattern by controlling a shape, size, and/or disposition density. For example, the transmission area TA is an area where the black mask 721 is not formed and may be an area through which external light passes. According to an embodiment of the disclosure, the black mask 721 may be changed or modified to terms, such as an anti-light diffraction film, an anti-light transmission film, a low-reflection anti-light diffraction film, or a low-reflection anti-light transmission film. According to an embodiment of the disclosure, the black mask 721 may include one or more materials selected from an opaque metal, organic material, or inorganic material. According to an embodiment of the disclosure, an area overlapped with at least a portion of the second pixels 332 and the black mask 721 may be defined as a light blocking area BA, and an area that is not overlapped with the second pixels 332 and the black mask 721 may be defined as a transmission area TA.

According to an embodiment of the disclosure, the first pixels 331 disposed in the first part A1 of the display panel 330 and the second pixels 332 disposed in the second part A2 of the display panel 330 may have different characteristics. According to an embodiment of the disclosure, in the first pixels 331 and the second pixels 332, at least one of a pixel resolution, pixel size, pixel stacking structure, pixel brightness, pixel lifespan characteristics, and/or pixel driving circuit structure (e.g., anode size, number, and the like) may be different. For example, the resolution (e.g., pixels per inch (PPI)) of the first pixels 331 may be greater than that of the second pixels 332. For example, the brightness of one first pixel 331*a* may be darker than that of one second pixel 332*a*. For example, the lifespan characteristics of the first pixels 331 may be higher than those of the second pixels 332.

As described later with reference to FIGS. 8 to 14, by independently performing sampling, burn-in prediction, burn-in map generation, and/or image compensation for burn-in on the first pixels 331 and the second pixels 332 having different characteristics, the electronic device 101 according to various embodiments may implement more accurate image compensation and reduce a memory use amount by reducing an amount of data computation and accumulated data.

Figure 8:
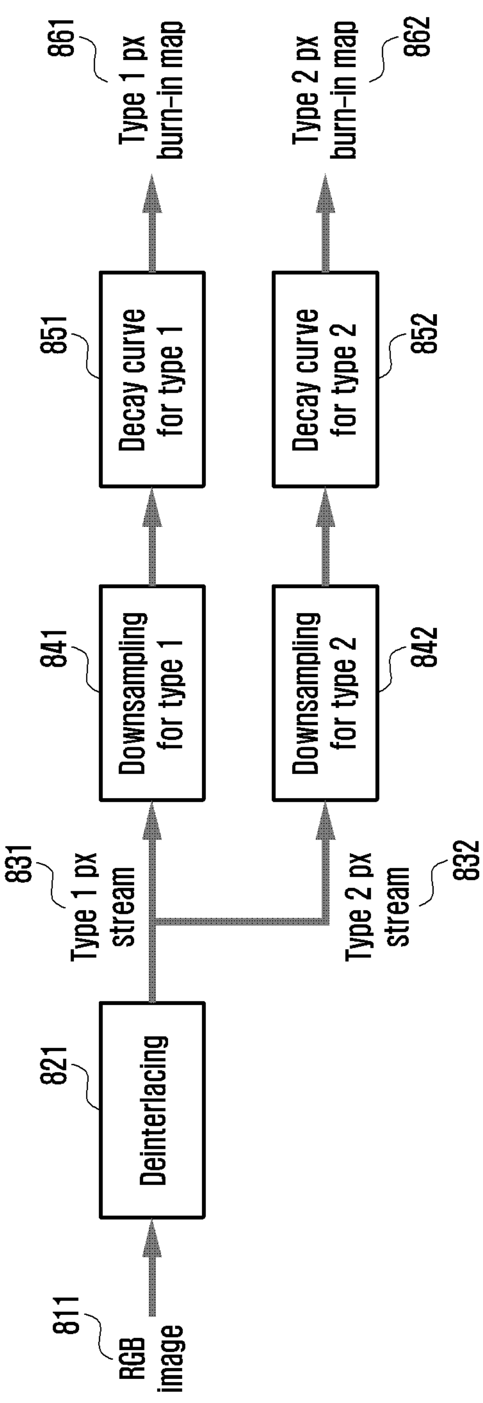
FIG. 8 is a flowchart illustrating an operation in which an electronic device accumulates and predicts a residual image or burn-in according to an embodiment of the disclosure.

FIG. 8 is a flowchart illustrating an operation in which an electronic device accumulates and predicts a residual image or burn-in according to an embodiment of the disclosure.

Figure 9:
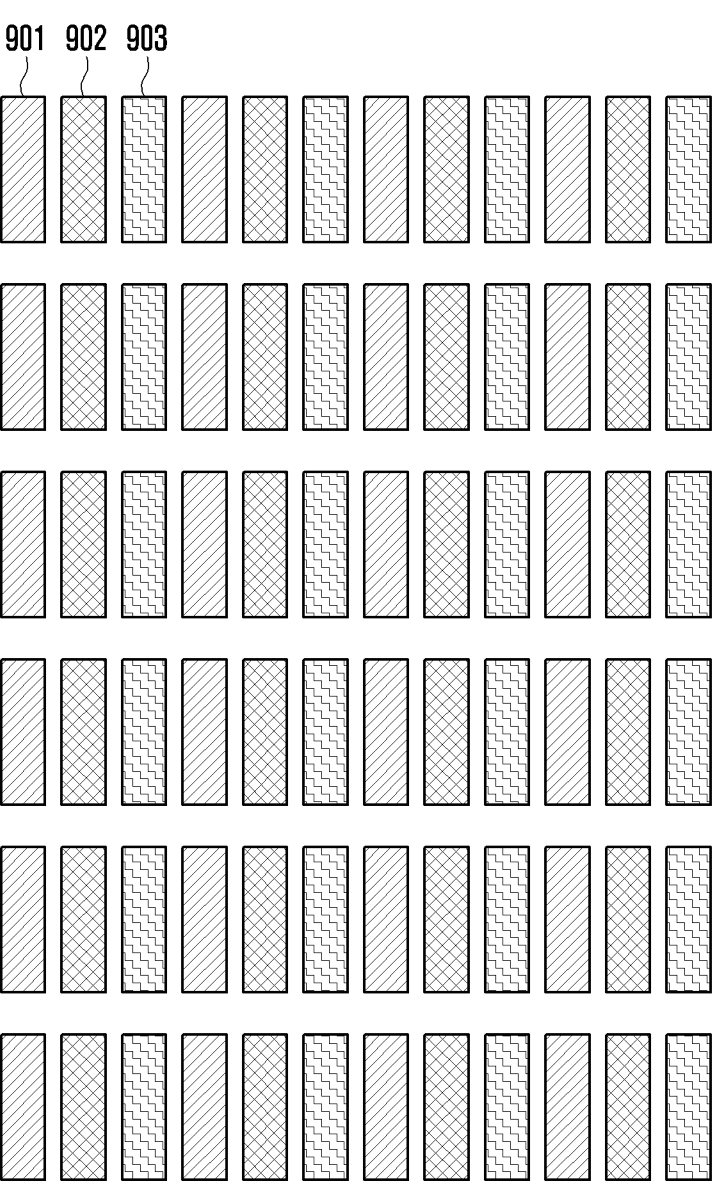
FIG. 9 illustrates a form in which pixels of a display panel are arranged in a red, green, and blue (RGB) stripe structure according to an embodiment of the disclosure.

FIG. 9 illustrates a form in which pixels of a display panel are arranged in an RGB stripe structure according to an embodiment of the disclosure.

Figure 10:
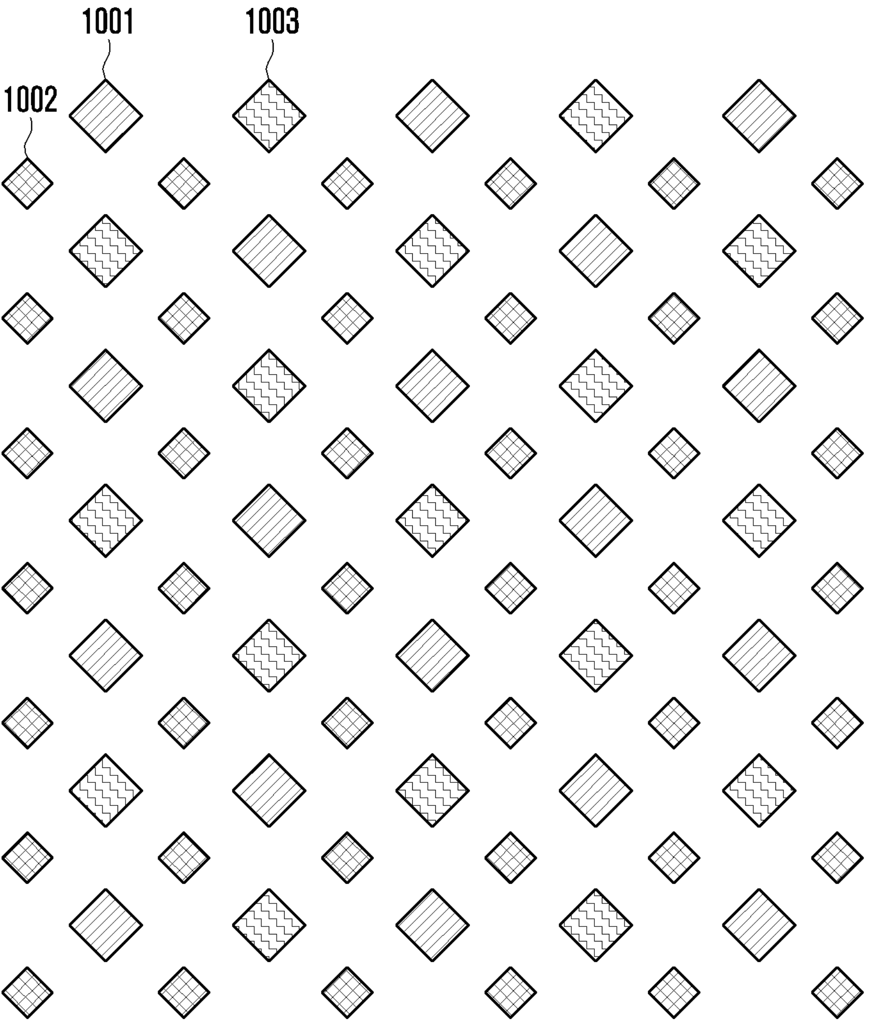
FIG. 10 illustrates a form in which pixels of a display panel are arranged in a pentile structure according to an embodiment of the disclosure.

FIG. 10 illustrates a form in which pixels of a display panel are arranged in a pentile structure according to an embodiment of the disclosure.

Figure 11:
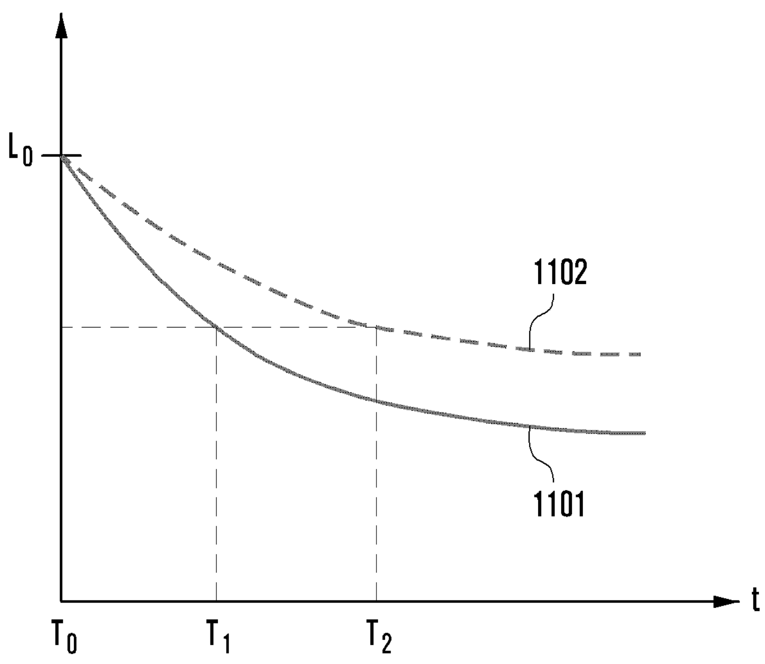
FIG. 11 illustrates a pixel lifespan characteristic curve according to an embodiment of the disclosure.

FIG. 11 illustrates a pixel lifespan characteristic curve according to an embodiment of the disclosure.

Referring to FIG. 11, the horizontal axis may represent a time, and the vertical axis may represent brightness.

At least some of the operations illustrated in FIG. 8 may be omitted. At least some operations described with reference to other drawings in this document may be additionally inserted before or after at least some operations illustrated in FIG. 8. Unlike the description below, at least some of the operations illustrated in FIG. 8 may be performed by the DDI 230.

Hereinafter, an operation in which the electronic device 101 accumulates and predicts a residual image or burn-in will be described in conjunction with FIGS. 8 to 11.

In operation 811, in the case that the electronic device 101 according to an embodiment displays a single image through the display panel 330 in which the first pixels 331 and the second pixels 332 having different characteristics coexist, the processor 120 may render an RGB domain-based image. Here, the RGB domain-based image may be defined as image data consisting of a combination of RGBs.

In operation 821, in order to accumulate an aging factor that causes a residual image or burn-in, the processor 120 according to an embodiment may de-interlace a pixel stream of an image in which rendering is completed into image streams corresponding to a form in which pixels are arranged in the display panel 330. For example, a form in which pixels are arranged in the display panel 330 may include an RGB stripe structure as illustrated in FIG. 9 or a pentile structure as illustrated in FIG. 10.

Referring to FIG. 9, in the display panel 330 to which the RGB stripe structure according to an embodiment is applied, a red pixel 901, a green pixel 902, and a blue pixel 903 may be disposed in a stripe shape, and the processor 120 may de-interlace the pixel stream of an image in which rendering is completed to correspond to such an RGB stripe structure.

Referring to FIG. 10, in the display panel 330 to which a pentile structure according to an embodiment is applied, pixels may be arranged in a combination of a red pixel 1001 and a green pixel 1002 or a combination of a blue pixel 1003 and a green pixel 1002, and each pixel has a diamond shape. Thus, the display panel 330 may be referred to as a display panel 330 to which a diamond pentile structure is applied. According to an embodiment of the disclosure, the processor 120 may de-interlace the pixel stream of an image in which rendering is completed to correspond to such a diamond pentile structure.

In operation 831, the processor 120 according to an embodiment may classify a first image corresponding to the first pixels 331 from the de-interlaced image stream. For example, the processor 120 may group the first image corresponding to the first pixels 331 from the image stream.

In operation 832, the processor 120 according to an embodiment may classify a second image corresponding to the second pixels 332 from the de-interlaced image stream. For example, the processor 120 may group a second image corresponding to the second pixels 332 from the image stream.

According to some embodiments of the disclosure, in operations 831 and 832, separation of the pixel stream may be performed in an RGB domain after rendering is performed in the processor 120.

In operation 841, the sampling module 321 of the processor 120 according to an embodiment may downsample an image stream classified into the first image to the first resolution. According to an embodiment of the disclosure, the processor 120 may downsample the image stream, thereby reducing an amount of computation of accumulated pixels.

In operation 842, the sampling module 321 of the processor 120 according to an embodiment may downsample the image stream classified into the second image to the second resolution. According to an embodiment of the disclosure, the processor 120 may downsample the image stream, thereby reducing an amount of computation of accumulated pixels.

According to an embodiment of the disclosure, the first resolution and the second resolution may be different from each other. For example, in the case that the electronic device 101 includes an optical sensor module (e.g., a fingerprint sensor or an illumination sensor) disposed to overlap an under display camera (UDC) (e.g., the camera module 180 of FIG. 7) or a display area (e.g., an active area) of the display panel 330, an image stream accumulated from the first pixels 331 that do not overlap the camera module (e.g., the camera module 180 of FIG. 7) may be downsampled to a resolution of 4*4 or 16*16, and an image stream accumulated from the second pixels 332 that at least partially overlap the camera module (e.g., the camera module 180 of FIG. 7) may perform an operation in an original resolution without downsampling. Accordingly, the electronic device 101 according to various embodiments may significantly reduce an amount of computations for accumulation of image streams and prediction of burn-in or residual image.

In operation 851, the burn-in prediction module 322 of the processor 120 according to an embodiment may predict the degree of residual image or burn-in of the input image with reference to a first lifespan characteristic curve (e.g., the first lifespan characteristic curve 1101 of FIG. 11) for the first pixels 331 of a first type (or first characteristic).

In operation 852, the burn-in prediction module 322 of the processor 120 according to an embodiment may predict the degree of residual image or burn-in of the input image with reference to a second lifespan characteristic curve (e.g., the second lifespan characteristic curve 1102 of FIG. 11) for the second pixels 332 of a second type (or second characteristic).

Referring to FIG. 11, characteristics of the pixel may be defined by a lifespan characteristic curve (e.g., a first lifespan characteristic curve 1101 or a second lifespan characteristic curve 1102) representing characteristics of the OLED included in the pixel. According to an embodiment of the disclosure, characteristics of the OLED corresponding to the first pixels 331 may be defined by the first lifespan characteristic curve 1101, and characteristics of the OLED corresponding to the second pixels 332 may be defined by the second lifespan characteristic curve 1102. For example, in the first lifespan characteristic curve 1101 and the second lifespan characteristic curve 1102, at least one of a slope at which brightness decreases over time, an inflection point at which a change in slope occurs, or a value (e.g., asymptotes) that converge to specific brightness after a certain time period may be different.

Brightness characteristics of the OLED may deteriorate over time due to an internal environment or other external environments during a manufacturing process, and the degree to which the brightness characteristics are deteriorated may vary according to characteristics of the OLED. For example, the first lifespan characteristic curve 1101 and the second lifespan characteristic curve 1102 may have the same initial brightness value of L0. For example, at a time point T0, a brightness value of the OLED corresponding to the first pixels 331 and a brightness value of the OLED corresponding to the second pixels 332 may be the same to L0. However, the first lifespan characteristic curve 1101 and the second lifespan characteristic curve 1102 may have different degrees of decrease in brightness over time. For example, at each time T1 and T2 after a time point T0, the brightness of the OLED according to the first lifespan characteristic curve 1101 and the brightness of the OLED according to the second lifespan characteristic curve 1102 may be different.

The burn-in prediction module 322 of the processor 120 according to an embodiment may predict a residual image or burn-in from a pixel stream separated by pixel characteristics based on a lifespan characteristic curve appropriate for each pixel characteristic. For example, the burn-in prediction module 322 may refer to the first lifespan characteristic curve 1101 to correspond to the characteristics of the first pixels 331 and the second lifespan characteristic curve 1102 to correspond to the characteristics of the second pixels 332.

In operations 861 and 862, the burn-in prediction module 322 of the processor 120 according to an embodiment may generate an independent burn-in map and store the generated burn-in map in the memory (e.g., the memory 130 of FIG. 1) based on a predicted residual image or predicted burn-in from the pixel stream separated by pixel characteristics. According to an embodiment of the disclosure, the burn-in prediction module 322 of the processor 120 may calculate a first burn-in map corresponding to the first pixels 331 and a second burn-in map corresponding to the second pixels 332 and store the calculated first burn-in map and second burn-in map in an independent memory (e.g., a GRAM1, 1301 and GRAM2, 1302 of FIG. 13).

According to an embodiment of the disclosure, the burn-in prediction module 322 may store the first burn-in map in a first memory area and the second burn-in map in a second memory area. According to some embodiments of the disclosure, the burn-in prediction module 322 may store the first burn-in map and the second burn-in map in different physically separate memories. For example, the electronic device 101 may include a first graphics memory (e.g., the GRAM1, 1301 of FIG. 13) and a second graphics memory (e.g., the GRAM2, 1302 of FIG. 13), and store the first burn-in map in the first graphics memory (e.g., the GRAM1, 1301 of FIG. 13) and the second burn-in map in the second graphics memory (e.g., the GRAM2, 1302 of FIG. 13).

According to an embodiment of the disclosure, when storing the first burn-in map and the second burn-in map in the memory, the burn-in prediction module 322 of the processor 120 may configure differently accuracy (e.g., number of bits per pixel data (or sub-pixel data)) storing data and a resolution (e.g., X1*Y1 or X2*Y2). For example, the burn-in prediction module 322 of the processor 120 may store the first burn-in map in the size of X1*Y1*n bits and the second burn-in map in the size of X2*Y2*m bits. For example, in the case that the size of data storing the burn-in map is 7 bits, the burn-in data may be stored with 128 lifespan characteristics, and in the case that the size of data storing the burn-in map is 4 bits, burn-in data may be expressed with 16 lifespan characteristics. In the case that the size of data storing the burn-in map is 4 bits, the accuracy of burn-in data is lower compared to the size of data storing the burn-in map being 7 bits, but a data use amount is less. Thus, a more efficient memory operation may be possible.

According to an embodiment of the disclosure, as described with reference to FIG. 4, in the case that the display panel 330 includes first pixels 331 for displaying an image in a general mode and second pixels 332 for displaying an image with a narrow viewing angle when a privacy protection mode is activated, when storing the first burn-in map and the second burn-in map in the memory, the burn-in prediction module 322 of the processor 120 may be configure differently accuracy (e.g., number of bits) storing data and the resolution. As illustrated in FIG. 4, in the case that the display panel 330 includes second pixels 332 for supporting a privacy protection mode, or as illustrated in FIG. 7, in the case that the display panel 330 includes second pixels 332 disposed to overlap at least a portion of the camera module 180, the first pixels 331 and the second pixels 332 having different lifespan characteristics may be disposed adjacently. In this case, the physically adjacently disposed first pixels 331 and second pixels 332 may have similar degrees of residual image or burn-in. The electronic device 101 according to an embodiment may generate and store a burn-in map (e.g., global burn-in map) corresponding to the entire area including both the first pixels 331 and the second pixels 332, and a burn-in map (e.g., local burn-in map) for a local area, which is at least a portion of the display panel 330 may be generated by accumulating only difference information (e.g., difference value) with a global burn-in map.

Figure 12:
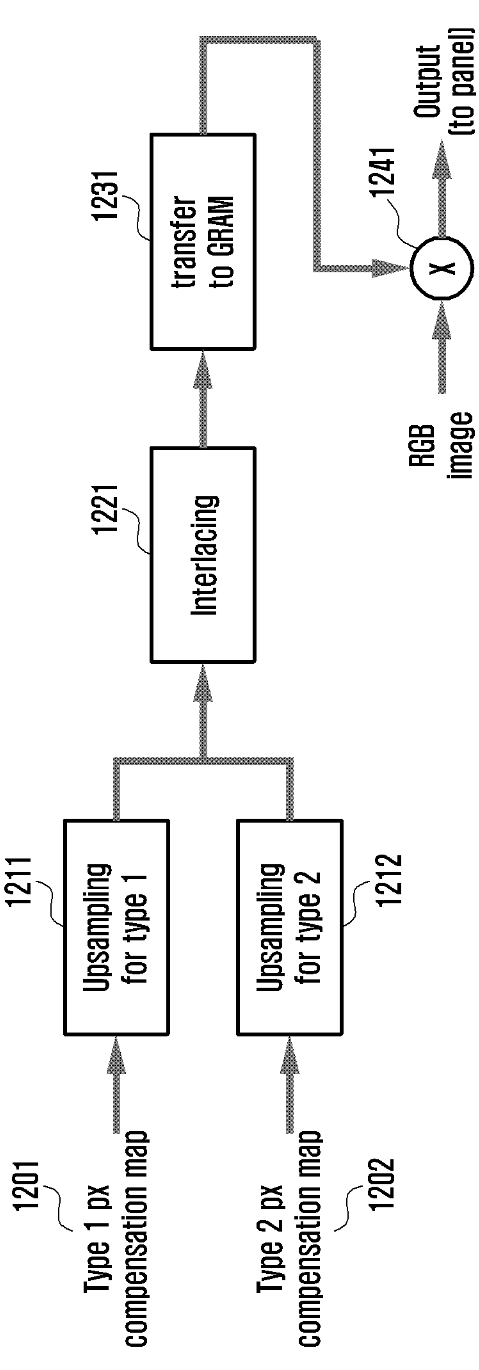
FIG. 12 is a flowchart illustrating an operation in which an electronic device compensates for a residual image or burn-in according to an embodiment of the disclosure.

FIG. 12 is a flowchart illustrating an operation in which an electronic device compensates for a residual image or burn-in according to an embodiment of the disclosure.

At least some of operations illustrated in FIG. 12 may be omitted. At least some operations described with reference to other drawings in this document may be additionally inserted before or after at least some operations illustrated in FIG. 12. Unlike the description below, at least some of the operations illustrated in FIG. 8 may be performed by the DDI 230.

Hereinafter, an operation in which the electronic device 101 according to an embodiment compensates for a residual image or burn-in will be described with reference to FIG. 12.

Referring to FIG. 12, in operations 1201 and 1202, the burn-in prediction module 322 of the processor 120 according to an embodiment may generate a compensation map including compensation data for compensating for a residual image or burn-in phenomenon of the display panel 330 based on the calculated burn-in map. According to an embodiment of the disclosure, the burn-in prediction module 322 may acquire a residual image predicted value for each pixel characteristic from the burn-in map and calculate compensation data corresponding to the acquired residual image predicted value. The burn-in prediction module 322 may calculate to map the calculated compensation data to the characteristics of each pixel, thereby generating a compensation map. For example, the burn-in prediction module 322 may acquire a residual image predicted value according to characteristics of the first pixels 331 from a first burn-in map, and generate a first compensation map including compensation data for compensating for a residual image or burn-in of the first pixels 331 according to the acquired residual image predicted value. For example, the burn-in prediction module 322 may acquire a residual image predicted value according to characteristics of the second pixels 332 from the second burn-in map, and generate a second compensation map including compensation data for compensating a residual image or residual image of the second pixels 332 according to the acquired residual image predicted value. In operations 1211 and 1212, the burn-in prediction module 322 of the processor 120 according to an embodiment may acquire a first compensation map and a second compensation map stored in the memory and up sample the acquired first compensation map and second compensation map. For example, the burn-in prediction module 322 may upsample the first compensation map to correspond to the resolution of the first pixels 331 and upsample the second compensation map to correspond to the resolution of the second pixels 332.

In operation 1221, the burn-in prediction module 322 of the processor 120 according to an embodiment may interlace or rearrange compensation data stored in each of the upsampled first compensation map and second compensation map to correspond to a form in which pixels are arranged in the display panel 330. For example, the interlacing operation may be performed based on the disposition of the first pixels 331 and the disposition of the second pixels 332.

In operation 1231, the burn-in prediction module 322 of the processor 120 according to an embodiment may transmit the interlaced compensation map to a memory (e.g., a graphics memory), and accordingly, the memory may store the entire compensation map corresponding to the entire display area of the display panel 330.

In operation 1241, the image compensation module 323 of the processor 120 according to an embodiment may perform an overlay operation of compensation data of an overall compensation map corresponding to the entire display area of the display panel 330 and image data generated (e.g., rendered) based on an RGB domain. According to an embodiment of the disclosure, the overlay operation may be an operation that compensates for a residual image or burn-in phenomenon of the display panel 330. For example, the overlay operation may be to perform an operation that mathematically multiplies image data by a specific ratio or to perform an operation that mathematically adds or subtracts a specific compensation value to image data.

According to an embodiment of the disclosure, the image compensation module 323 may control the DDI 230 to drive the display panel 330, thereby enabling the display panel 330 to display compensated image data. For example, the DDI 230 may convert compensated image data based on the entire compensation map into image data corresponding to a pentile structure in which pixels are arranged in the display panel 330, and drive the display panel 330 so as to display the converted image data.

Figure 13:
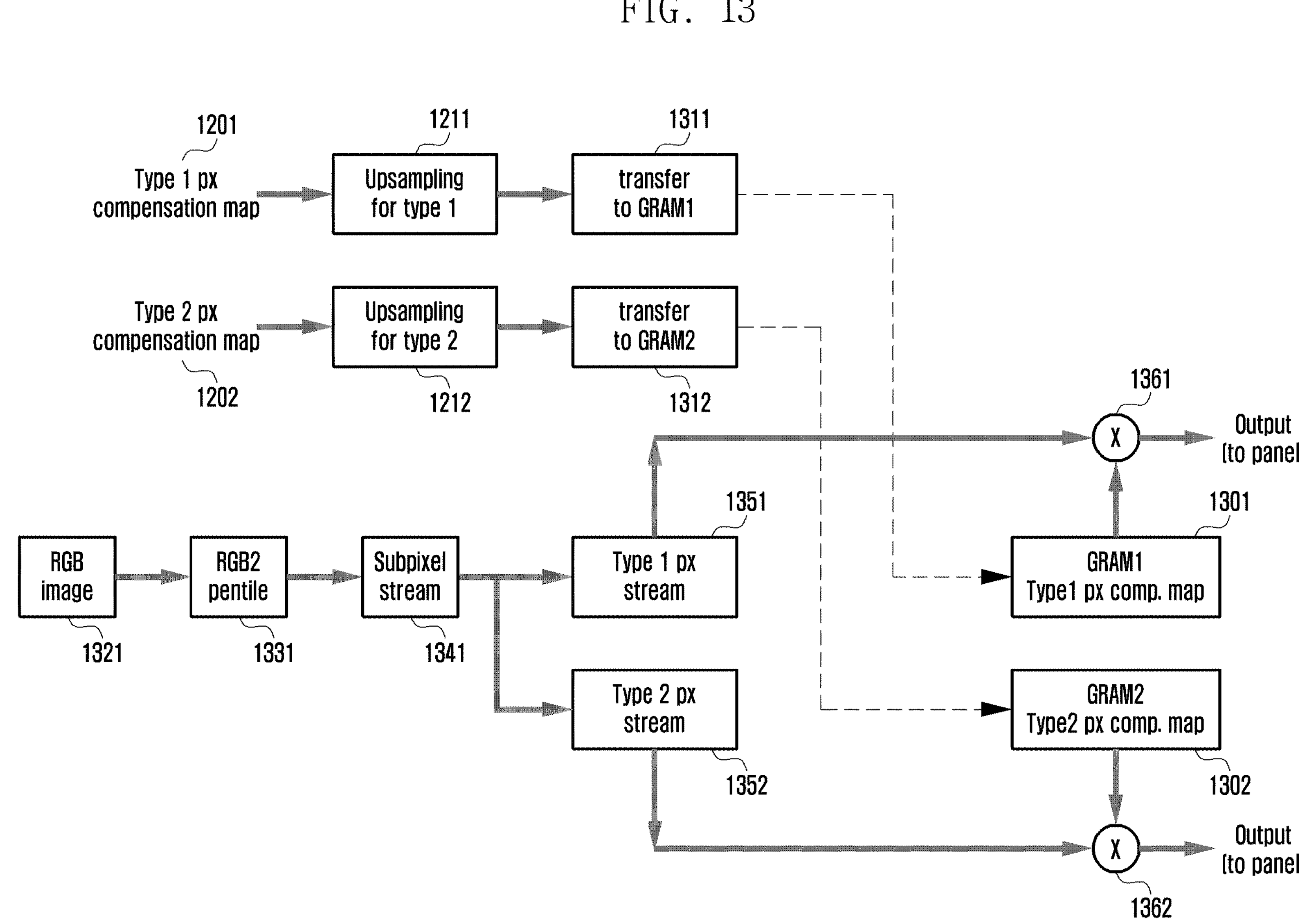
FIG. 13 is a flowchart illustrating an operation in which an electronic device compensates for a residual image or burn-in according to an embodiment of the disclosure.

FIG. 13 is a flowchart illustrating an operation in which an electronic device compensates for a residual image or burn-in according to an embodiment of the disclosure.

At least some of the operations illustrated in FIG. 13 may be omitted. At least some operations described with reference to other drawings in this document may be additionally inserted before or after at least some operations illustrated in FIG. 13. Unlike the description below, at least some of the operations illustrated in FIG. 8 may be performed by the DDI 230.

Hereinafter, an operation in which the electronic device 101 according to another embodiment compensates for a residual image or burn-in will be described with reference to FIG. 13.

Referring to FIG. 13, in operations 1201 and 1202, the burn-in prediction module 322 of the processor 120 according to an embodiment may generate a compensation map including compensation data for compensating for a residual image or burn-in phenomenon of the display panel 330 based on the calculated burn-in map. According to an embodiment of the disclosure, the burn-in prediction module 322 may acquire a residual image predicted value for each pixel characteristic from the burn-in map and calculate compensation data corresponding to the acquired residual image predicted value. The burn-in prediction module 322 may calculate to map the calculated compensation data to characteristics of each pixel, thereby generating a compensation map. For example, the burn-in prediction module 322 may acquire a residual image predicted value according to characteristics of the first pixels 331 from the first burn-in map and generate a first compensation map including compensation data for compensating for a residual image or burn-in of the first pixels 331 according to the acquired residual image predicted value. For example, the burn-in prediction module 322 may acquire a residual image predicted value according to characteristics of the second pixels 332 from the second burn-in map, and generate a second compensation map including compensation data for compensating for a residual image or burn-in of the second pixels 332 according to the acquired residual image predicted value. Operations 1201 and 1202 illustrated in FIG. 13 may be substantially the same as or at least partially similar to operations 1201 and 1202 described with reference to FIG. 12.

In operations 1211 and 1212, the burn-in prediction module 322 of the processor 120 according to an embodiment may acquire a first compensation map and a second compensation map stored in the memory, and upsample the acquired first compensation map and second compensation map. For example, the burn-in prediction module 322 may upsample the first compensation map to correspond to the resolution of the first pixels 331 and upsample the second compensation map to correspond to the resolution of the second pixels 332. Operations 1211 and 1212 illustrated in FIG. 13 may be substantially the same as or at least partially similar to operations 1211 and 1212 described with reference to FIG. 12.

In operations 1311 and 1312, the burn-in prediction module 322 of the processor 120 according to an embodiment may store the first burn-in map and the second burn-in map in an independent memory. For example, the burn-in prediction module 322 may store the first compensation map and the second compensation map in different memories. The burn-in prediction module 322 may store the first compensation map in a first memory area and store the second compensation map in a second memory area. According to some embodiments of the disclosure, the burn-in prediction module 322 may store the first compensation map and the second compensation map in different physically separate memories. For example, the electronic device 101 may include a first graphics memory (e.g., GRAM1, 1301) and a second graphics memory (e.g., GRAM2, 1302) and store a first compensation map in the first graphics memory (e.g., GRAM1, 1301) and a second compensation map in the second graphics memory (e.g., GRAM2, 1302). According to an embodiment of the disclosure, the processor 120 may transmit the generated first compensation map and/or second compensation map to the DDIC (e.g., the first graphics memory (e.g., GRAM1, 1301) and the second graphics memory (e.g., GRAM2 1302) included inside the DDI 230 of FIG. 3), and separately transmit the corresponding data and/or command as in 4 channels or 5 channels.

According to various embodiments of the disclosure, when performing operations 1211, 1212, 1311, and 1312, the electronic device 101 may use the DDI (e.g., the DDI 230 of FIG. 3 or the display driver IC 230 of FIG. 2) of the display module (e.g., the display module 160 of FIG. 2). For example, the electronic device 101 may store a first compensation map and a second compensation map in a GRAM (e.g., GRAM1, 1301 and/or GRAM2, 1302) included in the DDI using the DDI rather than the processor 120 (e.g., application processor (AP)). Further, the electronic device 101 may perform operations 1211, 1212, 1311, and 1312 using a plurality of GRAMs included in a plurality of DDIs.

According to an embodiment of the disclosure, when storing the first compensation map and the second compensation map in the memory, the burn-in prediction module 322 of the processor 120 may configure differently accuracy (e.g., number of bits per pixel data (or sub-pixel data)) storing data and a resolution (e.g., X1*Y1 or X2*Y2). For example, the burn-in prediction module 322 of the processor 120 may store the first compensation map in the size of X1*Y1*n bits and store the second compensation map in the size of X2*Y2*m bits. For example, in the case that the size of data storing the compensation map is 7 bits, compensation data may be stored in 128 compensation steps, and in the case that the size of data storing the compensation map is 4 bits, compensation data may be expressed in 16 compensation steps. In the case that the size of data storing the compensation map is 4 bits, the accuracy of the compensation data is lower compared to the size of data storing the compensation map being 7 bits, but a data use amount is less. Thus, a more efficient memory operation may be possible.

According to some embodiments of the disclosure, in order to adjust to match the degree of compensation or compensate independently according to characteristics of the pixels, the processor 120 may configure a first compensation map stored in the first graphics memory (e.g., GRAM1, 1301) and a second compensation map stored in the second graphics memory (e.g., GRAM2, 1302) to be synchronized with each other or to be independently asynchronized.

According to an embodiment of the disclosure, as described with reference to FIG. 4, in the case that the display panel 330 includes first pixels 331 for displaying an image in a general mode and second pixels 332 for displaying an image with a narrow viewing angle when a privacy protection mode is activated, when storing the first compensation map and the second compensation map in the memory, the burn-in prediction module 322 of the processor 120 may configure differently accuracy (e.g., number of bits per pixel data (or sub-pixel data)) storing data and the resolution.

In operation 1321, the processor 120 according to an embodiment may generate (e.g., render) an image to be displayed through the display panel 330. For example, the image rendered by the processor 120 may be an RGB domain-based image.

In operations 1331 and 1341, the processor 120 according to an embodiment may convert the generated image into a subpixel stream corresponding to a form in which pixels are arranged in the display panel 330. For example, the form in which pixels are arranged in the display panel 330 may include a pentile structure, as illustrated in FIG. 10, and the processor 120 may convert the image to correspond to these forms. For example, the processor 120 may rearrange RGB domain-based image data into image data for supplying to pixels in a combination of the red pixel 1001 and the green pixel 1002 or a combination of the blue pixel 1003 and the green pixel 1002 to correspond to a pentile structure.

In operations 1351 and 1352, the image compensation module 323 of the processor 120 according to an embodiment may group a first image corresponding to the first pixels 331 from a sub-pixel stream and group a second image corresponding to the second pixels 332.

In operation 1361, the image compensation module 323 of the processor 120 according to an embodiment may acquire a first compensation map from the first graphics memory (e.g., GRAM1, 1301) and perform an overlay operation of compensation data of the first compensation map and the grouped first image to generate a compensated first image.

In operation 1362, the image compensation module 323 of the processor 120 according to an embodiment may acquire a second compensation map from the second graphics memory (e.g., GRAM2 1302) and perform an overlay operation of compensation data of the second compensation map and the grouped second image to generate a compensated second image.

According to an embodiment of the disclosure, the overlay operation may be to perform an operation that mathematically multiplies image data by a specific ratio or to perform an operation that mathematically adds or subtracts a specific compensation value to image data.

According to an embodiment of the disclosure, the image compensation module 323 of the processor 120 controls the DDI 230 to drive the display panel 330 so that the display panel 330 may display the compensated first image and the compensated second image.

According to various embodiments of the disclosure, the sequence of operations in which the electronic device 101 compensates for a residual image or burn-in is not limited to the example illustrated in FIG. 13 and may be modified or changed in various ways.

According to various embodiments of the disclosure, the electronic device 101 may perform operation 1331 in a period between operations 1341 and 1351.

According to various embodiments of the disclosure, the electronic device 101 may perform operation 1331 in a period between operations 1351 and 1361.

According to various embodiments of the disclosure, the electronic device 101 may perform operation 1331 in a period after operation 1361 or operation 1362.

According to various embodiments of the disclosure, a period in which the electronic device 101 performs operations 1201, 1202, 1211, 1212, 1311, and 1312 may be independent of a period in which other operations illustrated in FIG. 13 are performed, and for example, the operations may be independent of a period in which operations after operation 1321 are performed. For example, operations in which the electronic device 101 generates a burn-in map as described in operations 1201, 1202, 1211, 1212, 1311, and 1312, and stores the generated burn-in map in the memory may be performed in different periods from that of operations that compensate for image data based on the burn-in map.

According to various embodiments of the disclosure, the display panel 330 is not limited to the illustrated form, and may be applied to various types of electronic devices 101 (e.g., foldable electronic devices). For example, the electronic device 101 may include a plurality of displays (e.g., main display and sub-display), and panel constitutions of each display may be different. For example, a first display (e.g., main display) may be formed with the first pixels 331, and a second display (e.g., sub display) may be formed with the first pixels 331 and the second pixels 332. According to another embodiment of the disclosure, the first pixels 331 and the second pixels 332 may be differently formed for each area of the first display (e.g., main display). For example, in the electronic device 101 that may be expanded horizontally or vertically, the first area (e.g., left area or upper area) may be formed with the first pixels 331 and the second pixels 332, and the second area (e.g., right area or lower area) may be formed with the first pixels 331. For example, in the electronic device 101, the first area may be used as an area to which a privacy protection mode may be applied (e.g., see FIG. 4), and the second area may be used as an area to which only a general mode may be applied.

Figure 14:
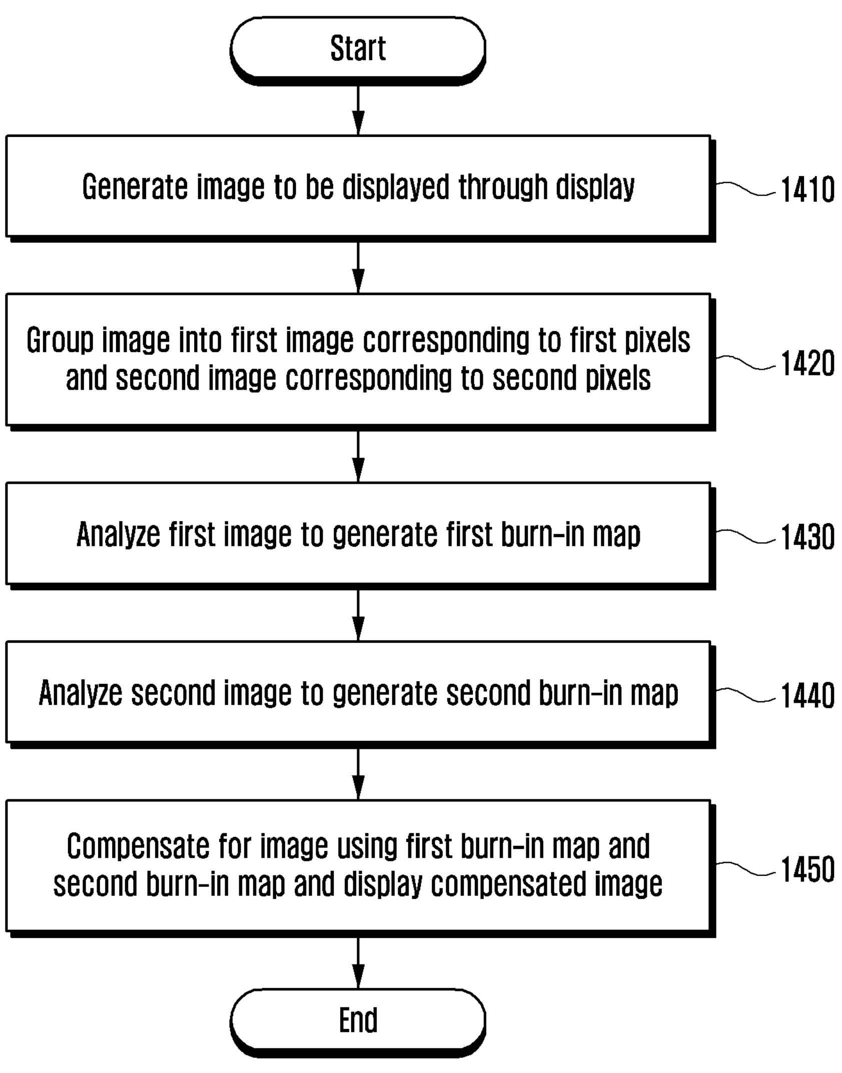
FIG. 14 is a flowchart illustrating an operation of an electronic device according to an embodiment of the disclosure.

FIG. 14 is a flowchart illustrating an operation of an electronic device according to an embodiment of the disclosure.

At least some of operations illustrated in FIG. 14 may be omitted. At least some operations described with reference to other drawings in this document may be additionally inserted before or after at least some operations illustrated in FIG. 14.

The operations illustrated in FIG. 14 may be performed by the processor 120 (e.g., the processor 120 of FIG. 1). For example, the memory (e.g., the memory 130 of FIG. 1) of the electronic device 101 may store when executed, instructions that enable the processor 120 to perform at least some operations illustrated in FIG. 14.

Referring to FIG. 14, in operation 1410, the electronic device 101 according to an embodiment may generate an image to be displayed through the display. For example, the electronic device 101 may generate (e.g., render) an image to be displayed through the display panel 330 based on an RGB domain.

In operation 1420, the electronic device 101 according to an embodiment may group the generated image into a first image corresponding to first pixels and a second image corresponding to second pixels. In order to accumulate an aging factor that causes a residual image or burn-in, the processor 120 according to an embodiment may de-interlace a pixel stream of an image in which rendering is completed into an image stream corresponding to an arranged form of the pixels in the display panel 330. For example, the arranged form of pixels in the display panel 330 may include an RGB stripe structure as illustrated in FIG. 9 or a pentile structure as illustrated in FIG. 10.

In operation 1430, the electronic device 101 according to an embodiment may analyze the first image to generate a first burn-in map. The burn-in prediction module 322 of the processor 120 according to an embodiment may predict the degree of a residual image or burn-in of the first pixels 331 with reference to a first lifespan characteristic curve (e.g., the first lifespan characteristic curve of FIG. 11) for the first pixels 331 of a first type (or first characteristic). The burn-in prediction module 322 of the processor 120 according to an embodiment may generate a first burn-in map corresponding to the first pixels 331 based on a predicted residual image or predicted burn-in.

In operation 1440, the electronic device 101 according to an embodiment may analyze a second image to generate a second burn-in map. The burn-in prediction module 322 of the processor 120 according to an embodiment may predict the degree of a residual image or burn-in of the second pixels 332 with reference to a second lifespan characteristic curve (e.g., the second lifespan characteristic curve of FIG. 11) for the second pixels 332 of a second type (or second characteristic). The burn-in prediction module 322 of the processor 120 according to an embodiment may generate a second burn-in map corresponding to the second pixels 332 based on a predicted residual image or predicted burn-in.

The electronic device 101 according to an embodiment may store a first burn-in map and the second burn-in map in an independent memory. For example, the electronic device 101 may include a first graphics memory (e.g., the GRAM1, 1301 of FIG. 13) and a second graphics memory (e.g., the GRAM2, 1302 of FIG. 13), store a first burn-in map in the first graphics memory (e.g., the GRAM1, 1301 of FIG. 13), and store a second burn-in map in the second graphics memory (e.g., the GRAM2, 1302 of FIG. 13).

In operation 1450, the electronic device 101 according to an embodiment may display an image for which burn-in or residual image has been compensated through the display using the first burn-in map and the second burn-in map. The burn-in prediction module 322 of the processor 120 according to an embodiment may generate a compensation map including compensation data for compensating for a residual image or burn-in phenomenon of the display panel 330 based on the calculated burn-in map. According to an embodiment of the disclosure, the burn-in prediction module 322 may acquire a residual image predicted value for each pixel characteristic from the burn-in map and calculate compensation data corresponding to the acquired residual image predicted value. The burn-in prediction module 322 may calculate to map the calculated compensation data to characteristics of each pixel, thereby generating a compensation map. For example, the burn-in prediction module 322 may acquire a residual image predicted value according to characteristics of the first pixels 331 from the first burn-in map, and generate a first compensation map including compensation data for compensating for a residual image burn-in of the first pixels 331 according to the acquired residual image predicted value. For example, the burn-in prediction module 322 may acquire a residual image predicted value according to characteristics of the second pixels 332 from the second burn-in map and generate a second compensation map including compensation data for compensating for a residual image or burn-in of the second pixels 332 according to the acquired residual image predicted value. According to various embodiments of the disclosure, the electronic device 101 may compensate for a generated image based on the first compensation map and the second compensation map and control the display to display the compensated image. An operation in which the electronic device 101 compensates for an image generated based on the first compensation map and the second compensation map may be at least partially similar or identical to the operations described with reference to FIGS. 12 and 13.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
- a display comprising a plurality of first pixels and a plurality of second pixels;
- a memory; and
- a processor,
- wherein the processor is configured to:
  - generate an image to be displayed through the display,
  - divide the image into a first image corresponding to the plurality of first pixels and a second image corresponding to the plurality of second pixels,
  - generate a first burn-in map based on the first image,
  - generate a second burn-in map based on the second image,
  - store the first burn-in map and the second burn-in map in the memory, and
  - control the display to display an image generated based on the first burn-in map and the second burn-in map to compensate for difference between burn-in of the plurality of first pixels and burn-in of the plurality of second pixels,
- wherein the plurality of first pixels are configured to display the first image at a first viewing angle, and
- wherein the plurality of second pixels are configured to display the second image at a second viewing angle.

2. The electronic device of claim 1, wherein the plurality of first pixels and the plurality of second pixels have different characteristics.

3. The electronic device of claim 2, wherein the characteristics comprise at least one of a pixel structure, a pixel size, a pixel array, a pixel aperture ratio, pixel brightness, a pixel resolution, a pixel lifespan, or distribution in which pixels are located in the display.

4. The electronic device of claim 1, wherein the processor is further configured to:
- downsample the first image to a first resolution, and
- downsample the second image to a second resolution.

5. The electronic device of claim 1, wherein the processor is further configured to:
- store the first burn-in map in a size of n bits, and
- store the second burn-in map in a size of m bits different from the n bits.

6. The electronic device of claim 1, wherein the processor is further configured to:
- generate the first burn-in map based on a first lifespan characteristic curve corresponding to characteristics of the plurality of first pixels, and
- generate the second burn-in map based on a second lifespan characteristic curve corresponding to characteristics of the plurality of second pixels.

7. The electronic device of claim 1, wherein the processor is further configured to:
- analyze an aging factor of the first image to generate a first burn-in map, and
- analyze an aging factor of the second image to generate a second burn-in map.

8. The electronic device of claim 7, wherein the aging factor comprises at least one of brightness, a temperature, or a cumulative emission time of an organic light emitting diode (OLED).

9. The electronic device of claim 1, wherein the second viewing angle is smaller than the first viewing angle.

10. A method for an electronic device to compensate for burn-in or residual image, the method comprising:
- generating an image to be displayed through a display;
- dividing the image into a first image corresponding to a plurality of first pixels of the display and a second image corresponding to a plurality of second pixels of the display;
- generating a first burn-in map based on the first image;
- generating a second burn-in map based on the second image;
- storing the first burn-in map and the second burn-in map in memory; and
- controlling the display to display an image generated based on the first burn-in map and the second burn-in map to compensate for difference between burn-in of the plurality of first pixels and burn-in of the plurality of second pixels,
- wherein the plurality of first pixels are configured to display the first image at a first viewing angle, and
- wherein the plurality of second pixels are configured to display the second image at a second viewing angle.

11. The method of claim 10, wherein the plurality of first pixels and the plurality of second pixels have different characteristics.

12. The method of claim 11, wherein the characteristics comprise at least one of a pixel structure, a size of one pixel, a pixel array, a pixel aperture ratio, pixel brightness, a pixel resolution, a pixel lifespan, or distribution in which pixels are located in the display.

13. The method of claim 10, further comprising:
- downsampling the first image to a first resolution; and
- downsampling the second image to a second resolution.

14. The method of claim 10, further comprising:
- storing the first burn-in map in a size of n bits; and
- storing the second burn-in map in a size of m bits different from the n bits.

15. The method of claim 10, further comprising:
- generating the first burn-in map based on a first lifespan characteristic curve corresponding to characteristics of the plurality of first pixels; and
- generating the second burn-in map based on a second lifespan characteristic curve corresponding to characteristics of the plurality of second pixels.

16. An electronic device comprising:
- a display comprising a plurality of first pixels configured to display an image at a first viewing angle, and a plurality of second pixels configured to display an image at a second viewing angle smaller than the first viewing angle;
- a memory; and
- a processor configured to:
  - generate an image to be displayed through the display,
  - generate a first burn-in map based on first data of the image corresponding to the plurality of first pixels,
  - generate a second burn-in map based on second data of the image corresponding to the plurality of second pixels,
  - store the first burn-in map in a first memory region of the memory,
  - store the second burn-in map in a second memory region of the memory,
  - and
  - control the display to display an image compensated for burn-in or residual image based on the first burn-in map and the second burn-in map.

17. The electronic device of claim 16, wherein the processor is configured to:
- generate the first burn-in map based on a first aging factor for the plurality of first pixels; and
- generate the second burn-in map based on a second aging factor for the plurality of second pixels,
- wherein the first aging factor includes at least one of luminance and cumulative emission time for the plurality of first pixels, and
- wherein the second aging factor includes at least one of luminance and cumulative emission time for the plurality of second pixels.

18. A method for an electronic device including a display comprising a plurality of first pixels configured to display an image at a first viewing angle and a plurality of second pixels configured to display an image at a second viewing angle smaller than the first viewing angle, the method comprising:
- generating an image to be displayed through a display;
- generating a first burn-in map based on first data of the image corresponding to the plurality of first pixels;
- generating a second burn-in map based on second data of the image corresponding to the plurality of second pixels;
- storing the first burn-in map in a first memory region of a memory;
- storing the second burn-in map in a second memory region of the memory; and
- displaying, through the display, an image compensated for burn-in or residual image based on the first burn-in map and the second burn-in map.

19. The method of claim 18, further comprising:
- generating the first burn-in map based on a first aging factor for the plurality of first pixels; and
- generating the second burn-in map based on a second aging factor for the plurality of second pixels,
- wherein the first aging factor includes at least one of luminance and cumulative emission time for the plurality of first pixels, and
- wherein the second aging factor includes at least one of luminance and cumulative emission time for the plurality of second pixels.

* * * * *